United States Patent
Ford et al.

(10) Patent No.: US 6,417,301 B1
(45) Date of Patent: Jul. 9, 2002

(54) PROCESS FOR PRODUCING ETHYLENE/OLEFIN INTERPOLYMERS

(75) Inventors: Randal Ray Ford; Jeffrey James Vanderbilt; Darryl Stephen Williams, all of Longview, TX (US)

(73) Assignee: Eastman Chemical Company, Kingsport, TN (US)

(*) Notice: Subject to any disclaimer, the term of this patent is extended or adjusted under 35 U.S.C. 154(b) by 0 days.

(21) Appl. No.: 09/386,545

(22) Filed: Aug. 31, 1999

Related U.S. Application Data

(60) Provisional application No. 60/137,979, filed on Jun. 7, 1999.

(51) Int. Cl.[7] .................................................. C08F 4/647
(52) U.S. Cl. .............................. 526/124.3; 526/348.1; 526/348; 526/209; 526/213; 526/217; 526/154; 526/157; 526/158
(58) Field of Search .......................... 526/124.3, 348.1, 526/348, 209, 213, 217, 154, 157, 158

(56) References Cited

U.S. PATENT DOCUMENTS

| | | |
|---|---|---|
| 4,564,647 A | 1/1986 | Hayashi et al. |
| 4,752,597 A | 6/1988 | Turner |
| 5,106,804 A | 4/1992 | Bailly et al. |
| 5,132,380 A | 7/1992 | Stevens et al. |
| 5,227,440 A | 7/1993 | Canich et al. |
| 5,296,565 A | 3/1994 | Ueda et al. |
| 5,324,800 A | 6/1994 | Welborn, Jr. et al. |
| 5,331,071 A | 7/1994 | Kataoka et al. |
| 5,332,706 A | 7/1994 | Nowlin et al. |
| 5,350,723 A | 9/1994 | Neithamer et al. |
| 5,399,635 A | 3/1995 | Neithamer et al. |
| 5,466,766 A | 11/1995 | Patsidis et al. |
| 5,468,702 A | 11/1995 | JeJelowo |
| 5,474,962 A | 12/1995 | Takahashi et al. |
| 5,578,537 A | 11/1996 | Herrmann et al. |
| 5,777,120 A | 7/1998 | Jordan et al. |
| 5,863,853 A | 1/1999 | Vaughan et al. |
| 5,866,663 A | 2/1999 | Brookhart et al. |
| 6,114,477 A | 9/2000 | Merrill et al. |

FOREIGN PATENT DOCUMENTS

| | | |
|---|---|---|
| EP | 0 614 917 A1 | 9/1994 |
| EP | 0 630 910 A1 | 12/1994 |
| EP | 0 719 803 A2 | 7/1996 |
| EP | 0 811 638 A2 | 12/1997 |
| GB | 851113 | * 10/1960 |

OTHER PUBLICATIONS

US 5,883,203, 03/1999, Cheruvu et al. (withdraw)
Shah, Handbook of Plastics Testing Technology, pp. 169–170, John Wiley & Sons, 1984.*
Wang, C., et al., *Organometallics*, 1998, pp. 3149–3151, vol. 17.
Small, B.L., et al., *Journal of the American Chemical Society*, 1998, pp. 7143–7144, vol. 120.
Scollard, J.D., et al., *Journal of the American Chemical Society*, 1996, pp. 10008–10009, vol. 118.
Database WPI, Week 199423, Derwent Publications Ltd., London, GB, AN 1994–189009, XP002137243 and JP 128331A (Showa Denko KK), May 10, 1994 (Abstract).

* cited by examiner

*Primary Examiner*—David W. Wu
*Assistant Examiner*—Ling-Siu Choi
(74) *Attorney, Agent, or Firm*—Bernard J. Graves, Jr.; Jonathan D. Wood; Lawrence A. Chaletsky

(57) ABSTRACT

There is described a process utilizing Ziegler-Natta catalysts for producing ethylene/olefin interpolymers which, for a given melt index and density, have a reduced melting peak temperature ($T_m$). The process involves contacting ethylene and at least one other olefin under polymerization conditions with a Ziegler-Natta catalyst and at least one modifier comprising at least one element from Group 15 and/or Group 16 in amounts sufficient to reduce the melting peak temperature of the ethylene/olefin interpolymer. Also described herein are novel ethylene/olefin interpolymers resulting from the process.

31 Claims, No Drawings

PROCESS FOR PRODUCING ETHYLENE/ OLEFIN INTERPOLYMERS

CROSS-REFERENCE TO RELATED APPLICATION

This application claims priority under 35 U.S.C. §119(e) to U.S. Provisional Application Ser. No. 60/137,979, filed Jun. 7, 1999.

FIELD OF INVENTION

The present invention relates to a process utilizing a Ziegler-Natta catalyst for producing ethylene/olefin interpolymers, which for a given melt index (MI) and density, have reduced melting peak temperatures ($T_m$). Melting peak temperature ($T_m$) is alternatively referred to as melt transition temperature or melting point. The present invention also relates to a process for reducing the melting peak temperature ($T_m$) of ethylene/olefin interpolymers having a given melt index and density. Additionally, this invention relates to novel ethylene/olefin interpolymers, and films and articles of manufacture produced therefrom.

BACKGROUND OF INVENTION

Polyethylene and interpolymers of ethylene are well known and are useful in many applications. In particular linear interpolymers of ethylene, also known as copolymers, terpolymers, and the like of ethylene, possess properties which distinguish them from other polyethylene polymers, such as branched ethylene homopolymers commonly referred to as LDPE (low density polyethylene). Certain of these properties are described by Anderson et al, U.S. Pat. No. 4,076,698.

A particularly useful polymerization medium for producing polymers and nterpolymers of ethylene is a gas phase process. Examples of such are given in U.S. Pat. Nos. 3,709,853; 4,003,712; 4,011,382; 4,302,566; 4,543,399; 4,882,400; 5,352,749 and 5,541,270 and Canadian Patent No. 991,798 and Belgian Patent No. 839,380.

Ziegler-Natta catalysts for the polymerization of olefins are well known in the art and have been known at least since the issuance of U.S. Pat. No. 3,113,115. Thereafter, many patents have been issued relating to new or improved Ziegler-Natta catalysts. Exemplary of such patents are U.S. Pat. Nos. 3,594,330; 3,676,415; 3,644,318; 3,917,575; 4,105,847; 4,148,754; 4,256,866; 4,298,713; 4,311,752; 4,363,904; 4,481,301 and Reissue 33,683.

These patents disclose Ziegler-Natta catalysts that are well known as typically consisting of a transition metal component and a co-catalyst that is typically an organoaluminum compound. Optionally used with the catalyst are activators such as halogenated hydrocarbons and activity modifiers such as electron donors.

The use of halogenated hydrocarbons with Ziegler-Natta polymerization catalysts in the production of polyethylene is disclosed in U.S. Pat. No. 3,354,139 and European Patent Nos. EP 0 529 977 B1 and EP 0 703 246 A1. As disclosed, the halogenated hydrocarbons may reduce the rate of ethane formation, improve catalyst efficiency, or provide other effects. Typical of such halogenated hydrocarbons are mono-halogen and polyhalogen substituted saturated or unsaturated aliphatic, alicyclic, or aromatic hydrocarbons having 1 to 12 carbon atoms. Exemplary aliphatic compounds include methyl chloride, methyl bromide, methyl iodide, methylene chloride, methylene bromide, methylene iodide, chloroform, bromoform, iodoform, carbon tetrachloride, carbon tetrabromide, carbon tetraiodide, ethyl chloride, ethyl bromide, 1,2-dichloroethane, 1,2-dibromoethane, methylchloroform, perchloroethylene and the like. Exemplary alicyclic compounds include chlorocyclopropane, tetrachlorocyclopentane and the like. Exemplary aromatic compounds include chlorobenzene, hexabromobenzene, benzotrichloride and the like. These compounds may be used individually or as mixtures thereof.

It is also well known in the polymerization of olefins, particularly where Ziegler-Natta catalysts are employed, to utilize, optionally, electron donors. Such electron donors often aid in increasing the efficiency of the catalyst and/or in controlling the stereospecificity of the polymer when an olefin, other than ethylene, is polymerized. Electron donors when employed during the catalyst preparation step are referred to as internal electron donors. Electron donors when utilized other than during the catalyst preparation step are referred to as external electron donor. For example, the external electron donor may be added to the preformed catalyst, to the prepolymer, and/or to the polymerization medium.

The use of electron donors in the field of propylene polymerization is well known and is primarily used to reduce the atactic form of the polymer and increase the production of the isotactic polymers. The use of electron donors generally improves the productivity of the catalyst in the production of isotactic polypropylene. This is shown generally in U.S. Pat. No. 4,981,930. It is also known to utilize electron donors to control molecular weight and molecular weight distribution of polypropylene. The result of increasing the stereoregularity, either the isotactic or syndiotactic content, of polypropylene is to increase the crystallinity of the polymer which generally correlates to an increase in the melting peak temperature ($T_m$). This is shown generally in U.S. Pat. Nos. 5,710,222 and 5,688,735.

The concept of stereoregularity is not relevant in the field of ethylene interpolymerization where ethylene constitutes at least about 50% by weight of the total monomers present in the polymer. See for example U.S. Pat. No. 5,055,535. In ethylene polymerization electron donors are utilized to control the molecular weight distribution (MWD) of the polymer and the activity of the catalyst in the polymerization medium. Exemplary patents describing the use of internal electron donors in producing polyethylene are U.S. Pat. Nos. 3,917,575; 4,187,385, 4,256,866; 4,293,673; 4,296,223; Reissue 33,683; 4,302,565; 4,302,566; and 5,470,812. Exemplary patents describing the use of external electron donors in producing polyethylene are U.S. Pat. Nos. 4,234,710; 4,287,328; 5,055,535 and 5,192,729.

U.S. Pat. No. 5,399,638 discloses the use of a morphology protector obtained by reacting alkylaluminum with an electron donor during a prepolymerization step to maintain the morphology of the support and the catalytic component on the prepolymerized support. Also disclosed is the use of the alkylaluminum electron donor complex to increase the effectiveness of the comonomer in reducing the density of the interpolymer in the case of interpolymerization.

U.S. Pat. No. 5,055,535 discloses the use of an external monoether electron donor, such as tetrahydrofuran (THF), to control molecular weight distribution.

U.S. Pat. No. 5,244,987 and 5,410,002 disclose the use of external electron donors to control the reactivity of catalyst particles in the polymerization reactor.

U.S. Pat. No. 4,652,540 discloses the use of carbonyl sulfide to reduce the adverse effect on polymerization activity resulting from poison impurities contained in the olefin feed streams.

Illustrative examples of electron donors include carboxylic acid esters, anhydrides, acid halides, ethers, thioethers, aldehydes, ketones, imines, amines, amides, nitriles, isonitriles, cyanates, isocyanates, thiocyanates, isothiocyanates, thioesters, dithioesters, carbonic esters, hydrocarbyl carbamates, hydrocarbyl thiocarbamates, hydrocarbyl dithiocarbamates, urethanes, sulfoxides, sulfones, sulfonamides, organosilicon compounds containing at least one oxygen atom, and nitrogen, phosphorus, arsenic or antimony compounds connected to an organic group through a carbon or oxygen atom.

SUMMARY OF THE INVENTION

Applicants have unexpectedly found that the addition of at least one compound comprising at least one element from Group 15 and/or Group16 of the Periodic Table of Elements, herein referred to as a modifier, in a process for preparing ethylene/olefin interpolymers, having a given melt index and density, reduces the melting peak temperature ($T_m$) of the ethylene/olefin interpolymer. The melting peak temperature ($T_m$) values herein were obtained by Differential Scanning Calorimetry in accordance with ASTM D 3418-97.

The polymerization process of the present invention for producing an ethylene/olefin interpolymer having, at a given melt index and density, a reduced melting peak temperature ($T_m$) comprises the introduction into a polymerization medium comprising ethylene and at least one or more other olefin(s), at least one Ziegler-Natta catalyst comprised of a component comprising at least one transition metal and a co-catalyst comprising at least one organometallic compound and at least one modifier, wherein the modifier is present in the polymerization medium in an amount sufficient to reduce the melting peak temperature ($T_m$) of the ethylene/olefin interpolymer to a level lower than would result in the same polymerization process in the absence of the modifier.

The present invention also relates to a process for reducing the melting peak temperature ($T_m$) of an ethylene/olefin interpolymer having a given melt index (MI) and density. The process comprises introducing a modifier, into a polymerization process comprising ethylene and at least one or more other olefin(s) and at least one Ziegler-Natta catalyst comprised of a component comprising at least one transition metal and a co-catalyst comprising at least one organometallic compound, in an amount sufficient to reduce the melting peak temperature ($T_m$).

The present invention also relates to ethylene/olefin interpolymers, which for a given melt index and density, have reduced melting peak temperatures ($T_m$).

All mention herein to elements of Groups of the Periodic Table are made in reference to the Periodic Table of the Elements, as published in "Chemical and Engineering News", 63(5), 27, 1985. In this format, the Groups are numbered 1 to 18.

DETAILED DESCRIPTION OF THE INVENTION

Applicants have unexpectedly found that the addition of at least one compound comprising at least one element from Group 15 and/or Group16 of the Periodic Table of Elements, herein referred to as a modifier, in a process for preparing ethylene/olefin interpolymers, having a given melt index and density, reduces the melting peak temperature ($T_m$) of the ethylene/olefin interpolymer. The melting peak temperature ($T_m$) values herein were obtained by Differential Scanning Calorimetry in accordance with ASTM D 3418-97.

The polymerization process of the present invention for producing an ethylene/olefin interpolymer having, at a given melt index and density, a reduced melting peak temperature ($T_m$) comprises the introduction into a polymerization medium comprising ethylene and at least one or more other olefin(s), at least one Ziegler-Natta catalyst comprised of a component comprising at least one transition metal and a co-catalyst comprising at least one organometallic compound and at least one modifier, wherein the modifier is present in the polymerization medium in an amount sufficient to reduce the melting peak temperature ($T_m$) of the ethylene/olefin interpolymer to a level lower than would result in the same polymerization process in the absence of the modifier.

The present invention also relates to a process for reducing the melting peak temperature ($T_m$) of an ethylene/olefin interpolymer having a given melt index (MI) and density. The process comprises introducing a modifier, into a polymerization process comprising ethylene and at least one or more other olefin(s) and at least one Ziegler-Natta catalyst comprised of a component comprising at least one transition metal and a co-catalyst comprising at least one organometallic compound, in an amount sufficient to reduce the melting peak temperature ($T_m$).

The present invention also relates to ethylene/olefin interpolymers, which or a given melt index and density, have reduced melting peak temperatures ($T_m$).

Optionally a halogenated hydrocarbon may be added to the polymerization medium. Any halogenated hydrocarbon may be used in the process of the present invention. If desired more than one halogenated hydrocarbon can be used. Typical of such halogenated hydrocarbons are monohalogen and polyhalogen substituted saturated or unsaturated aliphatic, alicyclic, or aromatic hydrocarbons having 1 to 12 carbon atoms.

The modifier and the optional halogenated hydrocarbon may be added to the polymerization medium in any manner. The modifier and the halogenated hydrocarbon may be added to the olefin polymerization catalyst prior to addition to the polymerization medium, or added separately from the catalyst to the polymerization medium in any manner known in the art. For example, the modifier may optionally be premixed with the halogenated hydrocarbon prior to addition to the polymerization medium.

If a gas phase fluidized bed process is utilized for interpolymerization of ethylene, it may be advantageous to add the modifier prior to the heat removal means, e.g., the heat exchanger, to slow the rate of fouling of said heat removal means in addition to reducing the melting peak temperature of the polymer product.

The modifier used herein to reduce the melting peak temperature ($T_m$) of the ethylene/olefin interpolymer is any compound comprising at least one atom selected from Group 15 and/or Group 16 of the Periodic Table of Elements. Illustrative examples of modifiers include carboxylic acid esters, anhydrides, acid halides, ethers, thioethers, aldehydes, ketones, imines, amines, amides, nitriles, isonitriles, cyanates, isocyanates, thiocyanates, isothiocyanates, thioesters, dithioesters, carbonic esters, hydrocarbyl carbamates, hydrocarbyl thiocarbamates, hydrocarbyl dithiocarbamates, urethanes, sulfoxides, sulfones, sulfonamides, organosilicon compounds containing at least one oxygen atom, and nitrogen, phosphorus, arsenic or antimony compounds connected to an organic group through a carbon or oxygen atom. Also illustrative are compounds such as $O_2$, CO, $CO_2$, COS, NO, $N_2O$, $NO_2$ and the like.

Exemplary of ethers used herein to reduce the melting peak temperature are any compounds comprising at least one C—O—C ether linkage. Included within the ether compounds are compounds containing heteroatoms, which are atoms other than carbon, selected from Groups 13, 14, 15, 16 and 17 of the Periodic Table of Elements. Exemplary ethers are dialkyl ethers, diaryl ethers, dialkaryl ethers, diaralkyl ethers, alkyl aryl ethers, alkyl alkaryl ethers, alkyl aralkyl ethers, aryl alkaryl ethers, aryl aralkyl ethers and alkaryl aralkyl ethers. Included within the ethers are compounds such as dimethyl ether; diethyl ether; dipropyl ether; diisopropyl ether; dibutyl ether; diisoamyl ether; di-tert-butyl ether; diphenyl ether; dibenzyl ether; divinyl ether; butyl methyl ether; butyl ethyl ether; sec-butyl methyl ether; tert-butyl methyl ether; cyclopentyl methyl ether; cyclohexyl ethyl ether; tert-amyl methyl ether; sec-butyl ethyl ether; chloromethyl methyl ether; trimethylsilylmethyl methyl ether; bis(trimethylsilylmethyl)ether; bis(2,2,2-trifluoroethyl)ether; methyl phenyl ether; ethylene oxide; propylene oxide; 1,2-epoxybutane; cyclopentene oxide; epichlorohydrin; furan; 2,3-dihydrofuran; 2,5-dihydrofuran; tetrahydrofuran; 2-methyltetrahydrofuran; 2,5-dimethyltetrahydrofuran; 2-methylfuran; 2,5-dimethylfuran; tetrahydropyran; 1,2-epoxybut-3-ene; styrene oxide; 2-ethylfuran; oxazole; 1,3,4-oxadiazole; 3,4-dichloro-1,2-epoxybutane; 3,4-dibromo-1,2-epoxybutane; dimethoxymethane; 1,1-dimethoxyethane; 1,1,1-trimethoxymethane; 1,1,1-trimethoxyethane; 1,1,2-trimethoxyethane; 1,1-dimethoxypropane; 1,2-dimethoxypropane; 2,2-dimethoxypropane; 1,3-dimethoxypropane; 1,1,3-trimethoxypropane; 1,4-dimethoxybutane; 1,2-dimethoxybenzene; 1,3-dimethoxybenzene; 1,4-dimethoxybenzene; ethylene glycol dimethyl ether; di(ethylene glycol)dimethyl ether; di(ethylene glycol) diethyl ether; di(ethylene glycol)dibutyl ether; di(ethylene glycol)tert-butyl methyl ether; tri(ethylene glycol)dimethyl ether; tri(ethylene glycol)diethyl ether; tetra(ethylene glycol)dimethyl ether; 2,2-diethyl-1,3-dimethoxypropane; 2-methyl-2-ethyl-1,3-dimethoxypropane; 2-methoxyfuran; 3-methoxyfuran; 1,3-dioxolane; 2-methyl-1,3-dioxolane; 2,2-dimethyl-1,3-dioxolane; 2-ethyl-2-methyl-1,3-dioxolane; 2,2-tetramethylene-1,3-dioxolane; 2,2-pentamethylene-1,3-dioxolane; 1,3-dioxane; 1,4-dioxane; 4-methyl-1,3-dioxane; 1,3,5-trioxane and 3,4-epoxytetrahydrofuran and the like.

Preferred for use herein as ether compounds to reduce the melting peak temperature are tetrahydrofuran, diethyl ether, dipropyl ether, diisopropyl ether, dibutyl ether, dioctyl ether, tert-butyl methyl ether, trimethylene oxide, 1,2-dimethoxyethane, 1,2-dimethoxypropane, 1,3-dimethoxypropane, 1,2-dimethoxybutane, 1,3-dimethoxybutane, 1,4-dimethoxybutane, and tetrahydropyran.

Exemplary of thioethers used herein to reduce the melting peak temperature are any compounds comprising at least one C—S—C thioether linkage. Included within the thioether compounds are compounds containing heteroatoms, which are atoms other than carbon, selected from Groups 13, 14, 15, 16 and 17 of the Periodic Table of Elements. Exemplary thioethers are dialkyl thioethers, diaryl thioethers, dialkaryl thioethers, diaralkyl thioethers, alkyl aryl thioethers, alkyl alkaryl thioethers, alkyl aralkyl thioethers, aryl alkaryl thioethers, aryl aralkyl thioethers and alkaryl aralkyl thioethers. Included are compounds such as dimethyl sulfide; diethyl sulfide; dipropyl sulfide; diisopropyl sulfide; dibutyl sulfide; dipentyl sulfide; dihexyl sulfide; dioctyl sulfide; diisoamyl sulfide; di-tert-butyl sulfide; diphenyl sulfide; dibenzyl sulfide; divinyl sulfide; diallyl sulfide; dipropargyl sulfide; dicyclopropyl sulfide; dicyclopentyl sulfide; dicyclohexyl sulfide; allyl methyl sulfide; allyl ethyl sulfide; allyl cyclohexyl sulfide; allyl phenyl sulfide; allyl benzyl sulfide; allyl 2-tolyl sulfide; allyl 3-tolyl sulfide; benzyl methyl sulfide; benzyl ethyl sulfide; benzyl isoamyl sulfide; benzyl chloromethyl sulfide; benzyl cyclohexyl sulfide; benzyl phenyl sulfide; benzyl 1-naphthyl sulfide; benzyl 2-naphthyl sulfide; butyl methyl sulfide; butyl ethyl sulfide; sec-butyl methyl sulfide; tert-butyl methyl sulfide; butyl cyclopentyl sulfide; butyl 2-chloroethyl sulfide; cyclopentyl methyl sulfide; cyclohexyl ethyl sulfide; cyclohexyl vinyl sulfide; tert-amyl methyl sulfide; sec-butyl ethyl sulfide; tert-butyl ethyl sulfide; tert-amyl ethyl sulfide; cyclododecyl methyl sulfide; bis(2-cyclopenten-1-yl)sulfide; 1-methylthio-1,3-cyclohexadiene; 1-methylthio-1,4-cyclohexadiene; chloromethyl methyl sulfide; chloromethyl ethyl sulfide; bis(2-tolyl)sulfide; trimethylsilylmethyl methyl sulfide; trimethylene sulfide; thiophene; 2,3-dihydrothiophene; 2,5-dihydrothiophene; tetrahydrothiophene; 2-methyltetrahydrothiophene; 2,5-dimethyltetrahydrothiophene; 4,5-dihydro-2-methylthiophene; 2-methylthiophene; 2,5-dimethylthiophene; 3-bromothiophene; 2,3-benzothiophene; 2-methylbenzothiophene; dibenzothiophene; isobenzothiophene; 1,1-bis(methylthio)ethane; 1,1,1-tris(methylthio)ethane; 1,1,2-tris(methylthio)ethane; 1,1-bis(methylthio)propane; 1,2-bis(methylthio)propane; 2,2-bis(methylthio)propane; 1,3-bis(methylthio)propane; 1,1,3-tris(methylthio)propane; 1,4-bis(methylthio)butane; 1,2-bis(methylthio)benzene; 1,3-bis(methylthio)benzene; 1,4-bis(methylthio)benzene; ethylene glycol dimethyl sulfide; ethylene glycol diethyl sulfide; ethylene glycol divinyl sulfide; ethylene glycol diphenyl sulfide; ethylene glycol tert-butyl methyl sulfide; ethylene glycol tert-butyl ethyl sulfide; 2,5-bis(methylthio)thiophene; 2-methylthiothiophene; 3-methylthiothiophene; 2-methylthiotetrahydropyran; 3-methylthiotetrahydropyran; 1,3-dithiolane; 2-methyl-1,3-dithiolane; 2,2-dimethyl-1,3-dithiolane; 2-ethyl-2-methyl-1,3-dithiolane; 2,2-tetramethylene-1,3-dithiolane; 2,2-pentamethylene-1,3-dithiolane; 2-vinyl-1,3-dithiolane; 2-chloromethyl-1,3-dithiolane; 2-methylthio-1,3-dithiolane; 1,3-dithiane; 1,4-dithiane; 4-methyl-1,3-dithiane; 1,3,5-trithiane; 2-(2-ethylhexyl)-1,3-bis(methylthio)propane; 2-isopropyl-1,3-bis(methylthio)propane; 2-butyl-1,3-bis(methylthio)propane; 2-sec-butyl-1,3-bis(methylthio)propane; 2-tert-butyl-1,3-bis(methylthio)propane; 2-cyclohexyl-1,3-bis(methylthio)propane; 2-phenyl-1,3-bis(methylthio)propane; 2-cumyl-1,3-bis(methylthio)propane; 2-(2-phenylethyl)-1,3-bis(methylthio)propane; 2-(2-cyclohexylethyl)-1,3-bis(methylthio)propane; 2-(p-chlorophenyl)-1,3-bis(methylthio)propane; 2-(p-fluorophenyl)-1,3-bis(methylthio)propane; 2-(diphenylmethyl)-1,3-bis(methylthio)propane; 2,2-dicyclohexyl-1,3-bis(methylthio)propane; 2,2-diethyl-1,3-bis(methylthio)propane; 2,2-dipropyl-1,3-bis(methylthio)propane; 2,2-diisopropyl-1,3-bis(methylthio)propane; 2,2-dibutyl-1,3-bis(methylthio)propane; 2,2-diisobutyl-1,3-bis(methylthio)propane; 2-methyl-2-ethyl-1,3-bis(methylthio)propane; 2-methyl-2-propyl-1,3-bis(methylthio)propane; 2-methyl-2-butyl-1,3-bis(methylthio)propane; 2-methyl-2-benzyl-1,3-bis(methylthio)propane; 2-methyl-2-methylcyclohexyl-1,3-bis(methylthio)propane; 2-isopropyl-2-isopentyl-1,3-bis(methylthio)propane; 2,2-bis(2-cyclohexylmethyl)-1,3-bis(methylthio)propane and the like.

Any amine may be used herein to reduce the melting peak temperature. Included are amine compounds containing heteroatoms, which are atoms other than carbon, selected from Groups 13, 14, 15, 16 and 17 of the Periodic Table of Elements. Exemplary amines are primary, secondary and tertiary alkyl, aryl, alkaryl and aralkyl substituted amines. Exemplary of amines are ammonia; methylamine; ethylamine; propylamine; isopropylamine; butylamine; isobutylamine; amylamine; isoamylamine; octylamine; cyclohexylamine; aniline; dimethylamine; diethylamine; dipropylamine; diisopropylamine; dibutylamine; diisobutylamine; diamylamine; diisoamylamine; dioctylamine; dicyclohexylamine; trimethylamine; triethylamine; tripropylamine; triisopropylamine; tributylamine; triisobutylamine; triamylamine; triisoamylamine; trioctylamine; tricyclohexylamine; N-methylaniline; N-ethylaniline; N-propylaniline; N-isopropylaniline; N-butylaniline; N-isobutylaniline; N-amylaniline; N-isoamylaniline; N-octylaniline; N-cyclohexylaniline; N,N-dimethylaniline; N,N-diethylaniline; N,N-dipropylaniline; N,N-diisopropylaniline; N,N-dibutylaniline; N,N-diisobutylaniline; N,N-diamylaniline; N,N-diisoamylaniline; N,N-dioctylaniline; N,N-dicyclohexylaniline; azetidine; 1-methylazetidine; 1-ethylazetidine; 1-propylazetidine; 1-isopropylazetidine; 1-butylazetidine; 1-isobutylazetidine; 1-amylazetidine; 1-isoamylazetidine; pyrrolidine; N-methylimidazole; 1-methylpyrrolidine; 1-ethylpyrrolidine; 1-propylpyrrolidine; 1-isopropylpyrrolidine; 1-butylpyrrolidine; 1-isobutylpyrrolidine; 1-amylpyrrolidine; 1-isoamylpyrrolidine; 1-octylpyrrolidine; 1-cyclohexylpyrrolidine; 1-phenylpyrrolidine; piperidine; 1-methylpiperidine; 1-ethylpiperidine; 1-propylpiperidine; 1-isopropylpiperidine; 1-butylpiperidine; 1-isobutylpiperidine; 1-amylpiperidine; 1-isoamylpiperidine; 1-octylpiperidine; 1-cyclohexylpiperidine; 1-phenylpiperidine; piperazine; 1-methylpiperazine; 1-ethylpiperazine; 1-propylpiperazine; 1-isopropylpiperazine; 1-butylpiperazine; 1-isobutylpiperazine; 1-amylpiperazine; 1-isoamylpiperazine; 1-octylpiperazine; 1-cyclohexylpiperazine; 1-phenylpiperazine; 1,4-dimethylpiperazine; 1,4-diethylpiperazine; 1,4-dipropylpiperazine; 1,4-diisopropylpiperazine; 1,4-dibutylpiperazine; 1,4-diisobutylpiperazine; 1,4-diamylpiperazine; 1,4-diisoamylpiperazine; 1,4-dioctylpiperazine; 1,4-dicyclohexylpiperazine; 1,4-diphenylpiperazine; pyridine; 2-methyl pyridine; 4-methyl pyridine; hexamethyldisilazane; morpholine; N-methylmorpholine and the like. Preferred for use herein are pyridine, 4-methyl pyridine, N-methylmorpholine and N-methylimidazole.

Exemplary of carboxylic acid esters used herein to reduce the melting peak temperature are any carboxylic acid ester compounds containing at least one C(=O)—O—C ester linkage. Exemplary carboxylic acid esters are saturated or unsaturated aliphatic, alicyclic, or aromatic compounds containing an ester linkage. Included within the carboxylic acid esters are compounds containing heteroatoms, which are atoms other than carbon, selected from Groups 13, 14, 15, 16 and 17 of the Periodic Table of Elements. Further exemplary are carboxylic acid esters such as methyl formate; methyl acetate; ethyl acetate; vinyl acetate; propyl acetate; butyl acetate; isopropyl acetate; isobutyl acetate; octyl acetate; cyclohexyl acetate; ethyl propionate; ethyl valerate; methyl chloroacetate; ethyl dichloroacetate, methyl methacrylate; ethyl crotonate; ethyl pivalate; methyl benzoate; ethyl benzoate; propyl benzoate; butyl benzoate; isobutyl benzoate; isopropyl benzoate; octyl benzoate; cyclohexyl benzoate; phenyl benzoate; benzyl benzoate; methyl 2-methylbenzoate; ethyl 2-methylbenzoate; propyl 2-methylbenzoate; isopropyl 2-methylbenzoate; butyl 2-methylbenzoate; isobutyl 2-methylbenzoate; octyl 2-methylbenzoate; cyclohexyl 2-methylbenzoate; phenyl 2-methylbenzoate; benzyl 2-methylbenzoate; methyl 3-methylbenzoate; ethyl 3-methylbenzoate; propyl 3-methylbenzoate; isopropyl 3-methylbenzoate; butyl 3-methylbenzoate; isobutyl 3-methylbenzoate; octyl 3-methylbenzoate; cyclohexyl 3-methylbenzoate; phenyl 3-methylbenzoate; benzyl 3-methylbenzoate; methyl 4-methylbenzoate; ethyl 4-methylbenzoate; propyl 4-methylbenzoate; isopropyl 4-methylbenzoate; butyl 4-methylbenzoate; isobutyl 4-methylbenzoate; octyl 4-methylbenzoate; cyclohexyl 4-methylbenzoate; phenyl 4-methylbenzoate; benzyl 4-methylbenzoate; methyl o-chlorobenzoate; ethyl o-chlorobenzoate; propyl o-chlorobenzoate; isopropyl o-chlorobenzoate; butyl o-chlorobenzoate; isobutyl o-chlorobenzoate; amyl o-chlorobenzoate; isoamyl o-chlorobenzoate; octyl o-chlorobenzoate; cyclohexyl o-chlorobenzoate; phenyl o-chlorobenzoate; benzyl o-chlorobenzoate; methyl m-chlorobenzoate; ethyl m-chlorobenzoate; propyl m-chlorobenzoate; isopropyl m-chlorobenzoate; butyl m-chlorobenzoate; isobutyl m-chlorobenzoate; amyl m-chlorobenzoate; isoamyl m-chlorobenzoate; octyl m-chlorobenzoate; cyclohexyl m-chlorobenzoate; phenyl m-chlorobenzoate; benzyl m-chlorobenzoate; methyl p-chlorobenzoate; ethyl p-chlorobenzoate; propyl p-chlorobenzoate; isopropyl p-chlorobenzoate; butyl p-chlorobenzoate; isobutyl p-chlorobenzoate; amyl p-chlorobenzoate; isoamyl p-chlorobenzoate; octyl p-chlorobenzoate; cyclohexyl p-chlorobenzoate; phenyl p-chlorobenzoate; benzyl p-chlorobenzoate; dimethyl maleate; dimethyl phthalate; diethyl phthalate; dipropyl phthalate; dibutyl phthalate; diisobutyl phthalate; methyl ethyl phthalate; methyl propyl phthalate; methyl butyl phthalate; methyl isobutyl phthalate; ethyl propyl phthalate; ethyl butyl phthalate; ethyl isobutyl phthalate; propyl butyl phthalate; propyl isobutyl phthalate; dimethyl terephthalate; diethyl terephthalate; dipropyl terephthalate; dibutyl terephthalate; diisobutyl terephthalate; methyl ethyl terephthalate; methyl propyl terephthalate; methyl butyl terephthalate; methyl isobutyl terephthalate; ethyl propyl terephthalate; ethyl butyl terephthalate; ethyl isobutyl terephthalate; propyl butyl terephthalate; propyl isobutyl terephthalate; dimethyl isophthalate; diethyl isophthalate; dipropyl isophthalate; dibutyl isophthalate; diisobutyl isophthalate; methyl ethyl isophthalate; methyl propyl isophthalate; methyl butyl isophthalate; methyl isobutyl isophthalate; ethyl propyl isophthalate; ethyl butyl isophthalate; ethyl isobutyl isophthalate; propyl butyl isophthalate; propyl isobutyl isophthalate, cellulose acetate, cellulose butyrate, mixed esters of cellulose and the like.

Exemplary of thioesters used herein to reduce the melting peak temperature are compounds containing at least one C(=O)—S—C thioester linkage. Exemplary are saturated or unsaturated aliphatic, alicyclic, or aromatic compounds containing a thioester linkage. Included within the thioesters are compounds containing heteroatoms, which are atoms other than carbon, selected from Groups 13, 14, 15, 16 and 17 of the Periodic Table of Elements. Exemplary thioesters are methyl thiolacetate; ethyl thiolacetate; propyl thiolacetate; isopropyl thiolacetate; butyl thiolacetate; isobutyl thiolacetate; amyl thiolacetate; isoamyl thiolacetate; octyl thiolacetate; cyclohexyl thiolacetate; phenyl thiolacetate; 2-chloroethyl thiolacetate; 3-chloropropyl thiolacetate; methyl thiobenzoate; ethyl thiobenzoate; propyl thiobenzoate; isopropyl thiobenzoate; butyl thiobenzoate; isobutyl thiobenzoate; amyl thiobenzoate; isoamyl thiobenzoate; octyl thiobenzoate; cyclohexyl thiobenzoate; phenyl thiobenzoate; 2-chloroethyl thiobenzoate; 3-chloropropyl thiobenzoate and the like.

Exemplary of amides used herein to reduce the melting peak temperature are compounds containing at least one C(=O)—N amide linkage. Exemplary are saturated or unsaturated aliphatic, alicyclic, or aromatic compounds containing an amide linkage. Included within the amides are compounds containing heteroatoms, which are atoms other than carbon, selected from Groups 13, 14, 15, 16 and 17 of the Periodic Table of Elements. Exemplary of amides are formamide; acetamide; propionamide; isobutyramide; trimethylacetamide; hexanoamide; octadecanamide; cyclohexanecarboxamide; 1-adamantanecarboxamide; acrylamide; methacrylamide; 2-fluoroacetamide; 2-chloroacetamide; 2-bromoacetamide; 2,2-dichloroacetamide; 2,2,2-trifluoroacetamide; 2,2,2-trichloroacetamide; 2-chloropropionamide; benzamide; N-methylformamide; N-ethylformamide; N-propylformamide; N-butylformamide; N-isobutylformamide; N-amylformamide; N-cyclohexylformamide; formanilide; N-methylacetamide; N-ethylacetamide; N-propylacetamide; N-butylacetamide; N-isobutylacetamide; N-amylacetamide; N-cyclohexylacetamide; acetanilide; N-methylpropionamide; N-ethylpropionamide; N-propylpropionamide; N-butylpropionamide; N-isobutylpropionamide; N-amylpropionamide; N-cyclohexylpropionamide; N-phenylpropionamide; N-methylisobutyramide; N-methyltrimethylacetamide; N-methylhexanoamide; N-methyloctadecanamide; N-methylacrylamide; N-methylmethacrylamide; N-methyl-2-fluoroacetamide; N-methyl-2-chloroacetamide; N-methyl-2-bromoacetamide; N-methyl-2,2-dichloroacetamide; N-methyl-2,2,2-trifluoroacetamide; N-methyl-2,2,2-trichloroacetamide; N-methyl-2-chloropropionamide; N,N-dimethylformamide; N,N-diethylformamide; N,N-diisopropylformamide; N,N-dibutylformamide; N-methylformanilide; N,N-dimethylacetamide; N,N-diethylacetamide; N,N-diisopropylacetamide; N,N-dibutylacetamide; N-methylacetanilide; N,N-dimethylpropionamide; N,N-diethylpropionamide; N,N-diisopropylpropionamide; N,N-dibutylpropionamide; N,N-dimethylisobutyramide; N,N-dimethyltrimethylacetamide; N,N-dimethylhexanoamide; N,N-dimethyloctadecanamide; N,N-dimethylacrylamide; N,N-dimethylmethacrylamide; N,N-dimethyl-2-fluoroacetamide; N,N-dimethyl-2-chloroacetamide; N,N-dimethyl-2-bromoacetamide; N,N-dimethyl-2,2-dichloroacetamide; N,N-dimethyl-2,2,2-trifluoroacetamide; N,N-diethyl-2,2,2-trifluoroacetamide; N,N-diisopropyl-2,2,2-trifluoroacetamide; N,N-dibutyl-2,2,2-trifluoroacetamide; N,N-dimethyl-2,2,2-trichloroacetamide; N,N-diethyl-2,2,2-trichloroacetamide; N,N-diisopropyl-2,2,2-trichloroacetamide; N,N-dibutyl-2,2,2-trichloroacetamide; N,N-dimethyl-2-chloropropionamide; 1-acetylazetidine; 1-acetylpyrrolidine; 1-acetylpiperidine; 1-acetylpiperazine; 1-acetylpiperazine; 1,4-diacetylpiperazine and the like. Preferred for use herein are N,N-formamide, N,N-dimethylacetamide and N,N-diisopropylformamide.

Exemplary of anhydrides used herein to reduce the melting peak temperature are compounds containing at least one C(=O)—O—C(=O) anhydride linkage. Exemplary are saturated or unsaturated aliphatic, alicyclic, or aromatic compounds containing an anhydride linkage. Included within the anhydrides are compounds containing heteroatoms, which are atoms other than carbon, selected from Groups 13, 14, 15, 16 and 17 of the Periodic Table of Elements. Exemplary of anhydrides are acetic anhydride; propionic anhydride; butyric anhydride; isobutyric anhydride; valeric anhydride; trimethylacetic anhydride; hexanoic anhydride; heptanoic anhydride; decanoic anhydride; lauric anhydride; myristic anhydride; palmitic anhydride; stearic anhydride; docosanoic anhydride; crotonic anhydride; methacrylic anhydride; oleic anhydride; linoleic anhydride; chloroacetic anhydride; iodoacetic anhydride; dichloroacetic anhydride; trifluoroacetic anhydride; chlorodifluoroacetic anhydride; trichloroacetic anhydride; pentafluoropropionic anhydride; heptafluorobutyric anhydride; succinic anhydride; methylsuccinic anhydride; 2,2-dimethylsuccinic anhydride; itaconic anhydride; maleic anhydride; glutaric anhydride; diglycolic anhydride; benzoic anhydride; phenylsuccinic anhydride; phenylmaleic anhydride; homophthalic anhydride; isatoic anhydride; phthalic anhydride; tetrafluorophthalic anhydride; tetrabromophthalic anhydride, mixed anhydrides and the like.

Exemplary of acid halides used herein to reduce the melting peak temperature are compounds containing at least one —C(=O)—X acid halide group where X is a halogen. Exemplary are saturated or unsaturated aliphatic, alicyclic, or aromatic compounds containing an acid halide group. Included within the acid halides are compounds containing heteroatoms, which are atoms other than carbon, selected from Groups 13, 14, 15, 16 and 17 of the Periodic Table of Elements. Exemplary of acid halides are acetyl chloride; acetyl bromide; chloroacetyl chloride; dichloroacetyl chloride; trichloroacetyl chloride; trifluoroacetyl chloride; tribromoacetyl chloride; propionyl chloride; propionyl bromide; butyryl chloride; isobutyryl chloride; trimethylacetyl chloride; 3-cyclopentylpropionyl chloride; 2-chloropropionyl chloride; 3-chloropropionyl chloride; tert-butylacetyl chloride; isovaleryl chloride; hexanoyl chloride; heptanoyl chloride; decanoyl chloride; lauroyl chloride; myristoyl chloride; palmitoyl chloride; stearoyl chloride; oleoyl chloride; cyclopentanecarbonyl chloride; oxalyl chloride; malonyl dichloride; succinyl chloride glutaryl dichloride; adipoyl chloride; pimeloyl chloride; suberoyl chloride; azelaoyl chloride; sebacoyl chloride; dodecanedioyl dichloride; methoxyacetyl chloride; acetoxyacetyl chloride and the like.

Exemplary of aldehydes used herein to reduce the melting peak temperature are compounds containing at least one C—C(=O)—H aldehyde group. Exemplary are saturated or unsaturated aliphatic, alicyclic, or aromatic compounds containing an aldehyde group. Included within the aldehydes are compounds containing heteroatoms, which are atoms other than carbon, selected from Groups 13, 14, 15, 16 and 17 of the Periodic Table of Elements. Exemplary of aldehydes are formaldehyde; acetaldehyde; propionaldehyde; isobutyraldehyde; trimethylacetaldehyde; butyraldehyde; 2-methylbutyraldehyde; valeraldehyde; isovaleraldehyde; hexanal; 2-ethylhexanal; heptaldehyde; decyl aldehyde; crotonaldehyde; acrolein; methacrolein; 2-ethylacrolein; chloroacetaldehyde; iodoacetaldehyde; dichloroacetaldehyde; trifluoroacetaldehyde; chlorodifluoroacetaldehyde; trichloroacetaldehyde; pentafluoropropionaldehyde; heptafluorobutyraldehyde; phenylacetaldehyde; benzaldehyde; o-tolualdehyde; m-tolualdehyde; p-tolualdehyde; trans-cinnamaldehyde; trans-2-nitrocinnamaldehyde;

2-bromobenzaldehyde; 2-chlorobenzaldehyde; 3-chlorobenzaldehyde; 4-chlorobenzaldehyde and the like.

Exemplary of ketones used herein to reduce the melting peak temperature are compounds containing at least one C—C(=O)—C ketone linkage. Exemplary are saturated or unsaturated aliphatic, alicyclic, or aromatic compounds containing a ketone linkage. Included within the ketones are compounds containing heteroatoms, which are atoms other than carbon, selected from Groups 13, 14, 15, 16 and 17 of the Periodic Table of Elements. Exemplary of ketones are acetone; 2-butanone; 3-methyl-2-butanone; pinacolone; 2-pentanone; 3-pentanone; 3-methyl-2-pentanone; 4-methyl-2-pentanone; 2-methyl-3-pentanone; 4,4-dimethyl-2-pentanone; 2,4-dimethyl-3-pentanone; 2,2,4,4-tetramethyl-3-pentanone; 2-hexanone; 3-hexanone; 5-methyl-2-hexanone; 2-methyl-3-hexanone; 2-heptanone; 3-heptanone; 4-heptanone; 2-methyl-3-heptanone; 5-methyl-3-heptanone; 2,6-dimethyl-4-heptanone; 2-octanone; 3-octanone; 4-octanone; acetophenone; benzophenone; mesityl oxide; hexafluoroacetone; perfluoro-2-butanone; 1,1,1-trichloroacetone and the like.

Exemplary of nitriles used herein to reduce the melting peak temperature are compounds containing at least one C—C≡N nitrile group. Exemplary are saturated or unsaturated aliphatic, alicyclic, or aromatic compounds containing a nitrile group. Included within the nitriles are compounds containing heteroatoms, which are atoms other than carbon, selected from Groups 13, 14, 15, 16 and 17 of the Periodic Table of Elements. Exemplary of nitriles are acetonitrile; propionitrile; isopropionitrile; butyronitrile; isobutyronitrile; valeronitrile; isovaleronitrile; trimethylacetonitrile; hexanenitrile; heptanenitrile; heptyl cyanide; octyl cyanide; undecanenitrile; malononitrile; succinonitrile; glutaronitrile; adiponitrile; sebaconitrile; allyl cyanide; acrylonitrile; crotononitrile; methacrylonitrile; fumaronitrile; tetracyanoethylene; cyclopentanecarbonitrile; cyclohexanecarbonitrile; dichloroacetonitrile; fluoroacetonitrile; trichloroacetonitrile; benzonitrile; benzyl cyanide; 2-methylbenzyl cyanide; 2-chlorobenzonitrile; 3-chlorobenzonitrile; 4-chlorobenzonitrile; o-tolunitrile; m-tolunitrile; p-tolunitrile and the like. Preferred for use herein are acetonitrile; isopropionitrile; trimethylacetonitrile and benzonitrile.

Exemplary of isonitriles or isocyanides used herein to reduce the melting peak temperature are compounds containing at least one C—N≡C isocyanide group. Exemplary are saturated or unsaturated aliphatic, alicyclic, or aromatic compounds containing a isocyanide group. Included within the isocyanides are compounds containing heteroatoms, which are atoms other than carbon, selected from Groups 13, 14, 15, 16 and 17 of the Periodic Table of Elements. Exemplary of isocyanides are methyl isocyanide; ethyl isocyanide; propyl isocyanide; isopropyl isocyanide; n-butyl isocyanide; t-butyl isocyanide; s-butyl isocyanide; pentyl cyanide; hexyl isocyanide; heptyl isocyanide; octyl isocyanide; nonyl isocyanide; decyl isocyanide; undecane isocyanide; benzyl isocyanide; 2-methylbenzyl isocyanide; 2-chlorobenzo isocyanide; 3-chlorobenzo isocyanide; 4-chlorobenzo isocyanide; o-toluyl isocyanide; m-toluyl isocyanide; p-toluyl isocyanide; phenyl isocyanide dichloride; 1,4-phenylene diisocyanide and the like.

Exemplary of thiocyanates used herein to reduce the melting peak temperature are compounds containing at least one C-SCN thiocyanate group. Exemplary are saturated or unsaturated aliphatic, alicyclic, or aromatic compounds containing a thiocyanate group. Included within the thiocyanates are compounds containing heteroatoms, which are atoms other than carbon, selected from Groups 13, 14, 15, 16 and 17 of the Periodic Table of Elements. Exemplary of thiocyanates are methyl thiocyanate; ethyl thiocyanate; propyl thiocyanate; isopropyl thiocyanate; n-butyl thiocyanate; t-butyl thiocyanate; s-butyl thiocyanate; pentyl thiocyanate; hexyl thiocyanate; heptyl thiocyanate; octyl thiocyanate; nonyl thiocyanate; decyl thiocyanate; undecane thiocyanate; benzyl thiocyanate; phenyl thiocyanate; 4'-bromophenyacyl thiocyanate; 2-methylbenzyl thiocyanate; 2-chlorobenzo thiocyanate; 3-chlorobenzo thiocyanate; 4-chlorobenzo thiocyanate; o-toluyl thiocyanate; m-toluyl thiocyanate; p-toluyl thiocyanate and the like.

Exemplary of isothiocyanates used herein to reduce the melting peak temperature are compounds containing at least one C-NCS isothiocyanate group. Exemplary are saturated or unsaturated aliphatic, alicyclic, or aromatic compounds containing a isothiocyanate group. Included within the isothiocyanates are compounds containing heteroatoms, which are atoms other than carbon, selected from Groups 13, 14, 15, 16 and 17 of the Periodic Table of Elements. Exemplary of isothiocyanates are methyl isothiocyanate; ethyl isothiocyanate; propyl isothiocyanate; isopropyl isothiocyanate; n-butyl isothiocyanate; t-butyl isothiocyanate; s-butyl isothiocyanate; pentyl isothiocyanate; hexyl isothiocyanate; heptyl isothiocyanate; octyl isothiocyanate; nonyl isothiocyanate; decyl isothiocyanate; undecane isothiocyanate; phenyl isothiocyanate; benzyl isothiocyanate; phenethyl isothiocyanate; o-tolyl isothiocyanate; 2-fluorophenyl isothiocyanate; 3-fluorophenyl isothiocyanate; 4-fluorophenyl isothiocyanate; 2-nitrophenyl isothiocyanate; 3-nitrophenyl isothiocyanate; 4-nitrophenyl isothiocyanate; 2-chlorophenyl isothiocyanate; 2-bromophenyl isothiocyanate; 3-chlorophenyl isothiocyanate; 3-bromophenyl isothiocyanate; 4-chlorophenyl isothiocyanate; 2,4-dichlorophenyl isothiocyanate; R-(+)-alpha-methylbenzyl isothiocyanate; S-(−)-alpha-methylbenzyl isothiocyanate; 3-isoprenyl-alpha,alpha-dimethylbenzyl isothiocyanate; trans-2-phenylcyclopropyl isothiocyanate; 1,3-bis(isocyanatomethyl)-benzene; 1,3-bis(1-isocyanato-1-methylethyl)benzene; 2-ethylphenyl isothiocyanate; benzoyl isothiocyanate; 1-naphthyl isothiocyanate; benzoyl isothiocyanate; 4-bromophenyl isothiocyanate; 2-methoxyphenyl isothiocyanate; m-tolyl isothiocyanate; alpha, alpha, alpha-trifluoro-m-tolyl isothiocyanate; 3-fluorophenyl isothiocyanate; 3-chlorophenyl isothiocyanate; 3-bromophenyl isothiocyanate; 1,4-phenylene diisothiocyanate; 1-isothiocyanato-4-(trans-4-propylcyclohexyl) benzene; 1-(trans-4-hexylcyclohexyl)-4-isothiocyanatobenzene; 1-isothiocyanato-4-(trans-4-octylcyclohexyl)benzene; 2-methylbenzyl isothiocyanate; 2-chlorobenzo isothiocyanate; 3-chlorobenzo isothiocyanate; 4-chlorobenzo isothiocyanate; m-toluyl isothiocyanate; p-toluyl isothiocyanate and the like.

Exemplary of sulfoxides used herein to reduce the melting peak temperature are compounds containing at least one C—S(=O)—C sulfone group. Exemplary are saturated or unsaturated aliphatic, alicyclic, or aromatic compounds containing a sulfoxo group. Included within the sulfoxides are compounds containing heteroatoms, which are atoms other than carbon, selected from Groups 13, 14, 15, 16 and 17 of the Periodic Table of Elements. Exemplary of sulfoxides are methyl sulfoxide; ethylsulfoxide; propylsulfoxide; butyl sulfoxide; pentyl sulfoxide; hexyl sulfoxide; heptyl sulfoxide; octyl sulfoxide; nonyl sulfoxide; decyl sulfoxide; phenyl sulfoxide; p-tolyl sulfoxide; m-tolyl sulfoxide; o-tolyl sulfoxide; methyl phenyl sulfoxide; (R)-(+)-methyl p-tolyl sulfoxide; (S)-(−)-methyl phenyl sulfoxide; phenyl vinyl sulfoxide; 4-chlorophenyl sulfoxide; methyl(phenylsulfinyl) acetate; benzyl sulfoxide; tetramethylene sulfoxide; methyl methylsulfinylmethyl sulfide; dl-methionine sulfoxide; dl-methionine sulfoximine and the like.

Exemplary of sulfones used herein to reduce the melting peak temperature are compounds containing at least one C—S(=O)$_2$—C sulfone group. Exemplary are saturated or unsaturated aliphatic, alicyclic, or aromatic compounds containing a sulfone group. Included within the sulfones are compounds containing heteroatoms, which are atoms other than carbon, selected from Groups 13, 14, 15, 16 and 17 of the Periodic Table of Elements. Exemplary of sulfones are methyl sulfone; ethyl sulfone; propyl sulfone; butyl sulfone; methyl vinyl sulfone; ethyl vinyl sulfone; divinyl sulfone; phenyl vinyl sulfone; allyl phenyl sulfone; cis-1,2-bis (phenylsulfonyl)ethylene; 2-(phenylsulfonyl) tetrahydropyran; chloromethyl phenyl sulfone; bromomethyl phenyl sulfone; phenyl tribromomethyl sulfone; 2-chloroethyl phenyl sulfone; methylthiomethyl phenyl sulfone; (phenylsulfonyl)acetonitrile; chloromethyl p-tolyl sulfone; N,N-bis(p-tolylsulfonylmethyl)-ethylamine; methylthiomethyl p-tolyl sulfone; 2-(phenylsulfonyl) acetophenone; methyl phenylsulfonylacetate; 4-fluorophenyl methyl sulfone; 4-chlorophenyl 2-chloro-1, 1,2-trifluoroethyl sulfone; tosylmethyl isocyanide; phenyl sulfone; benzyl sulfone; phenyl trans-styryl sulfone; 1-methyl-2-((phenylsulfonyl)methyl)-benzene; 1-bromomethyl-2-((phenylsulfonyl)-methyl)benzene; p-tolyl sulfone; bis(phenylsulfonyl)methane; 4-chlorophenyl phenyl sulfone; 4-fluorophenyl sulfone; 4-chlorophenyl sulfone; 4,4'-sulfonylbis(methyl benzoate); 9-oxo-9H-thioxanthene-3-carbonitrile 10,10-dioxide; tetramethylene sulfone; 3-methylsulfolane; 2,4-dimethylsulfolane; trans-3,4-dichlorotetrahydrothiophene 1,1-dioxide; trans-3,4-dibromotetrahydrothiophene 1,1-dioxide; 3,4-epoxytetrahydrothiophene-1,1-dioxide; butadiene sulfone; 3-ethyl-2,5-dihydrothiophene-1,1-dioxide and the like.

Exemplary of phosphorous compounds used herein to reduce the melting peak temperature are saturated or unsaturated aliphatic, alicyclic, or aromatic phosphorous compounds having 2 to 50 carbon atoms containing at least one phosphorous atom. Included within the phosphorous compounds are compounds containing heteroatoms, which are atoms other than carbon, selected from Groups 13, 14, 15, 16 and 17 of the Periodic Table of Elements. Exemplary of phosphorous compounds are trimethylphosphine; triethylphosphine; trimethyl phosphite; triethyl phosphite; hexamethylphosphorus triamide; hexamethylphosphoramide; tripiperidinophosphine oxide; triphenylphosphine; tri-p-tolylphosphine; tri-m-tolylphosphine; tri-o-tolylphosphine; methyldiphenylphosphine; ethyldiphenylphosphine; isopropyldiphenylphosphine; allyldiphenylphosphine; cyclohexyldiphenylphosphine; benzyldiphenylphosphine; di-tert-butyl dimethylphosphoramidite; di-tert-butyl diethylphosphoramidite; di-tert-butyl diisopropylphosphoramidite; diallyl diisopropylphosphoramidite and the like.

Exemplary of organosilicon compounds used herein to reduce the melting peak temperature are saturated or unsaturated aliphatic, alicyclic, or aromatic organosilicon compounds having 2 to 50 carbon atoms containing at least one oxygen atom. Included within the organosilicon compounds are compounds containing heteroatoms, which are atoms other than carbon, selected from Groups 13, 14, 15, 16 and 17 of the Periodic Table of Elements. Exemplary of organosilicon compounds are tetramethyl orthosilicate; tetraethyl orthosilicate; tetrapropyl orthosilicate; tetrabutyl orthosilicate; trichloromethoxysilane; trichloroethoxysilane; trichloropropoxysilane; trichloroisopropoxysilane; trichlorobutoxysilane; trichloroisobutoxysilane; dichlorodimethoxysilane; dichlorodiethoxysilane; dichlorodipropoxysilane; dichlorodiisopropoxysilane; dichlorodibutoxysilane; dichlorodiisobutoxysilane; chlorotrimethoxysilane; chlorotriethoxysilane; chlorotripropoxysilane; chlorotriisopropoxysilane; chlorotributoxysilane; chlorotriisobutoxysilane; dimethylmethoxysilane; diethylmethoxysilane; dipropylmethoxysilane; diisopropylmethoxysilane; dibutylmethoxysilane; diisobutylmethoxysilane; dipentylmethoxysilane; dicyclopentylmethoxysilane; dihexylmethoxysilane; dicyclohexylmethoxysilane; diphenylmethoxysilane; dimethylethoxysilane; diethylethoxysilane; dipropylethoxysilane; diisopropylethoxysilane; dibutylethoxysilane; diisobutylethoxysilane; dipentylethoxysilane; dicyclopentylethoxysilane; dihexylethoxysilane; dicyclohexylethoxysilane; diphenylethoxysilane; trimethylmethoxysilane; triethylmethoxysilane; tripropylmethoxysilane; triisopropylmethoxysilane; tributylmethoxysilane; triisobutylmethoxysilane; tripentylmethoxysilane; tricyclopentylmethoxysilane; trihexylmethoxysilane; tricyclohexylmethoxysilane; triphenylmethoxysiane; trimethylethoxysilane; triethylethoxysilane; tripropylethoxysilane; triisopropylethoxysilane; tributylethoxysilane; triisobutylethoxysilane; tripentylethoxysilane; tricyclopentylethoxysilane; trihexylethoxysilane; tricyclohexylethoxysilane; triphenylethoxysilane; dimethydimethoxysilane; diethyldimethoxysilane; dipropyldimethoxysilane; diisopropyldimethoxysilane; dibutyldimethoxysilane; diisobutyldimethoxysilane; dipentyldimethoxysilane; dicyclopentyldimethoxysilane; dihexyldimethoxysilane; dicyclohexyldimethoxysilane; diphenyldimethoxysilane; dimethyldiethoxysilane; diethyldiethoxysilane; dipropyldiethoxysilane; diisopropyldiethoxysilane; dibutyldiethoxysilane; diisobutyldiethoxysilane; dipentyldiethoxysilane; dicyclopentyldiethoxysilane; dihexyldiethoxysilane; dicyclohexyldiethoxysilane; diphenyldiethoxysilane; cyclopentylmethyldimethoxysilane; cyclopentylethyldimethoxysilane; cyclopentylpropyldimethoxysilane; cyclopentylmethyldiethoxysilane; cyclopentylethyldiethoxysilane; cyclopentylpropyldiethoxysilane; cyclohexylmethyldimethoxysilane; cyclohexylethyldimethoxysilane; cyclohexylpropyldimethoxysilane; cyclohexylmethyldiethoxysilane; cyclohexylethyldiethoxysilane; cyclohexylpropyldiethoxysilane; methyltrimethoxysilane; ethyltrimethoxysilane; vinyltrimethoxysilane; propyltrimethoxysilane; isopropyltrimethoxysilane; butyltrimethoxysilane; isobutyltrimethoxysilane; tert-butyltrimethoxysilane; phenyltrimethoxysilane; norbonanetrimethoxysilane; methyltriethoxysilane; ethyltriethoxysilane; vinyltriethoxysilane; propyltriethoxysilane; isopropyltriethoxysilane; butyltriethoxysilane; isobutyltriethoxysilane; tert-butyltriethoxysilane; phenyltriethoxysilane; norbornanetriethoxysilane; 2,3-dimethyl-2-(trimethoxysilyl)butane; 2,3-dimethyl-2-(triethoxysilyl) butane; 2,3-dimethyl-2-(tripropoxysilyl)butane; 2,3-dimethyl-2-(triisopropoxysilyl)butane; 2,3-dimethyl-2-(trimethoxysilyl)pentane; 2,3-dimethyl-2-(triethoxysilyl) pentane; 2,3-dimethyl-2-(tripropoxysilyl)pentane; 2,3-dimethyl-2-(triisopropoxysilyl)pentane; 2-methyl-3-ethyl-2-(trimethoxysilyl)pentane; 2-methyl-3-ethyl-2-(triethoxysilyl)pentane; 2-methyl-3-ethyl-2-(tripropoxysilyl)pentane; 2-methyl-3-ethyl-2-(triisopropoxysilyl)pentane; 2,3,4-trimethyl-2-(trimethoxysilyl)pentane; 2,3,4-trimethyl-2-(triethoxysilyl) pentane; 2,3,4-trimethyl-2-(tripropoxysilyl)pentane; 2,3,4- trimethyl-2-(triisopropoxysilyl)pentane; 2,3-dimethyl-2-(trimethoxysilyl)hexane; 2,3-dimethyl-2-(triethoxysilyl)hexane; 2,3-dimethyl-2-(tripropoxysilyl)hexane; 2,3-dimethyl-2-(triisopropoxysilyl)hexane; 2,4-dimethyl-3-ethyl-2-(trimethoxysilyl)pentane; 2,4-dimethyl-3-ethyl-2-(triethoxysilyl)pentane; 2,4-dimethyl-3-ethyl-2-(tripropoxysilyl)pentane; 2,4-dimethyl-3-ethyl-2-(triisopropoxysilyl)pentane; 2,4-dimethyl-3-isopropyl-2-(trimethoxysilyl)pentane; 2,4-dimethyl-3-isopropyl-2-(triethoxysilyl)pentane; 2,4-dimethyl-3-isopropyl-2-(tripropoxysilyl)pentane; 2,4-dimethyl-3-isopropyl-2-(triisopropoxysilyl)pentane; hexamethyldisiloxane; 1,1,1,3,3,3-hexamethyldisilazane and the like. Preferred for use herein are cyclohexylmethyldimethoxysilane, tetraethyl orthosilicate and dicyclopentyldimethoxysilane.

Mixtures or combinations of two or more of the above modifiers can also be used herein as the modifier to reduce the melting peak temperature.

The Ziegler-Natta catalysts utilized herein are well known in the industry. The Ziegler-Natta catalysts in the simplest form are comprised of a component comprising at least one transition metal and a co-catalyst comprising at least one organometallic compound. The metal of the transition metal component is a metal selected from Groups 4, 5, 6, 7, 8, 9 and/or 10 of the Periodic Table of the Elements, as published in "Chemical and Engineering News", 63(5), 27, 1985. In this format, the groups are numbered 1–18. Exemplary of such transition metals are titanium, zirconium, vanadium, chromium, manganese, iron, cobalt, nickel, and the like, and mixtures thereof. In a preferred embodiment the transition metal is selected from the group consisting of titanium, zirconium, vanadium and chromium, and in a still further preferred embodiment, the transition metal is titanium. The Ziegler-Natta catalyst can optionally contain magnesium and/or chlorine. Such magnesium and chlorine containing catalysts may be prepared by any manner known in the art.

Any or all of the components of the Ziegler-Natta catalyst can be supported on a carrier. The carrier can be any particulate organic or inorganic material. Preferably the carrier particle size should not be larger than about 200 microns in diameter. The most preferred particle size of the carrier material can be easily established by experiment. Preferably, the carrier should have an average particle size of 5 to 200 microns in diameter, more preferably 10 to 150 microns and most preferably 20 to 100 microns.

Examples of suitable inorganic carriers include metal oxides, metal hydroxides, metal halogenides or other metal salts, such as sulphates, carbonates, phosphates, nitrates and silicates. Exemplary of inorganic carriers suitable for use herein are compounds of metals from Groups 1 and 2 of the of the Periodic Table of the Elements, such as salts of sodium or potassium and oxides or salts of magnesium or calcium, for instance the chlorides, sulphates, carbonates, phosphates or silicates of sodium, potassium, magnesium or calcium and the oxides or hydroxides of, for instance, magnesium or calcium. Also suitable for use are inorganic oxides such as silica, titania, alumina, zirconia, chromia, boron oxide, silanized silica, silica hydrogels, silica xerogels, silica aerogels, and mixed oxides such as talcs, silica/chromia, silica/chromia/titania, silica/alumina, silica/titania, silica/magnesia, silica/magnesia/titania, aluminum phosphate gels, silica co-gels and the like. The inorganic oxides may contain small amounts of carbonates, nitrates, sulfates and oxides such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$. Carriers containing at least one component selected from the group consisting of $MgCl_2$, $SiO_2$, $Al_2O_3$ or mixtures thereof as a main component are preferred.

Examples of suitable organic carriers include polymers such as, for example, polyethylene, polypropylene, interpolymers of ethylene and alpha-olefins, polystyrene, functionalized polystyrene, polyamides and polyesters.

In the event that the catalyst is to be used in prepolymer form, the organometallic co-catalyst compound used to form the prepolymer can be any organometallic compound comprising a metal of Groups 1, 2, 11, 12, 13 and 14 of the above described Periodic Table of the Elements. Exemplary of such metals are lithium, magnesium, copper, zinc, boron, silicon and the like, and mixtures thereof. When a prepolymer is employed in the polymerization medium, additional organometallic co-catalyst(s) if utilized, may be the same or different as that utilized in preparing the prepolymer. The modifier and/or the halogenated hydrocarbon can be added to the prepolymer.

The catalyst may contain conventional components in addition to the transition metal component and the co-catalyst component. For example, there may be added any magnesium compound, halogenated hydrocarbon and the like.

Furthermore there may be added to the catalyst any internal electron donor. The internal electron donor compound preferably is selected from the group consisting of carboxylic acid esters, anhydrides, acid halides, ethers, thioethers, aldehydes, ketones, imines, amines, amides, nitrites, isonitriles, cyanates, isocyanates, thiocyanates, isothiocyanates, thioesters, dithioesters, carbonic esters, hydrocarbyl carbamates, hydrocarbyl thiocarbamates, hydrocarbyl dithiocarbamates, urethanes, sulfoxides, sulfones, sulfonamides, organosilicon compounds containing at least one oxygen atom, and nitrogen, phosphorus, arsenic or antimony compounds connected to an organic group through a carbon or oxygen atom. More preferred as internal electron donors are compounds containing from 1 to 50 carbon atoms and from 1 to 30 heteroatoms of an element, or mixtures thereof, selected from Groups 14, 15, 16 and 17 of the Periodic Table of Elements.

The Ziegler-Natta catalyst may be prepared by any method known in the art. The catalyst can be in the form of a solution, a slurry or a dry free flowing powder. The amount of Ziegler-Natta catalyst used is that which is sufficient to allow production of the desired amount of the polyolefin.

The co-catalyst used in the process of the present invention can be any organometallic compound, or mixtures thereof, that can activate the transition metal compound in a Ziegler-Natta catalyst in the polymerization of olefins. Preferably the organometallic co-catalyst compound is at least one compound of the formula,

or mixtures thereof,
wherein
X is hydrogen, halogen, or mixtures of halogens, selected from fluorine, chlorine, bromine and iodine;
n ranges from 0 to 2;
E is an element from Group 13 of the Periodic Table of Elements such as boron, aluminum and gallium; and
R is a hydrocarbon group, containing from 1 to 100 carbon atoms and from 0 to 10 oxygen atoms, connected to the Group 13 element by a carbon or oxygen bond.

Exemplary of the R group suitable for use herein is $C_{1-100}$ alkyl, $C_{1-100}$ alkoxy, $C_{2-100}$ alkenyl, $C_{4-100}$ dienyl, $C_{3-100}$ cycloalkyl, $C_{3-100}$ cycloalkoxy, $C_{3-100}$ cycloalkenyl, $C_{4-100}$ cyclodienyl, $C_{6-100}$ aryl, $C_{7-100}$ aralkyl, $C_{7-100}$ aralkoxy and $C_{7-100}$ alkaryl. Also exemplary of the R group are hydrocarbons containing from 1 to 100 carbon atoms and from 1 to 10 oxygen atoms.

Exemplary of the co-catalyst compounds used in the process of the present invention where n=0 are trimethylaluminum; triethylborane; triethylgallane; triethylaluminum; tri-n-propylaluminum; tri-n-butylaluminum; tri-n-pentylaluminum; triisoprenylaluminum; tri-n-hexylaluminum; tri-n-heptylaluminum; tri-n-octylaluminum; triisopropylaluminum; triisobutylaluminum; tris(cylcohexylmethyl)aluminum; dimethylaluminum methoxide; dimethylaluminum ethoxide; diethylaluminum ethoxide and the like. Exemplary of compounds where n=1 are dimethylaluminum chloride; diethylaluminum chloride; di-n-propylaluminum chloride; di-n-butylaluminum chloride; di-n-pentylaluminum chloride; diisoprenylaluminum chloride; di-n-hexylaluminum chloride; di-n-heptylaluminum chloride; di-n-octylaluminum chloride; diisopropylaluminum chloride; diisobutylaluminum chloride; bis(cylcohexylmethyl)aluminum chloride; diethylaluminum fluoride; diethylaluminum bromide; diethylaluminum iodide; dimethylaluminum hydride; diethylaluminum hydride; di-n-propylaluminum hydride; di-n-butylaluminum hydride; di-n-pentylaluminum hydride; diisoprenylaluminum hydride; di-n-hexylaluminum hydride; di-n-heptylaluminum hydride; di-n-octylaluminum hydride; diisopropylaluminum hydride; diisobutylaluminum hydride; bis(cylcohexylmethyl)aluminum hydride; chloromethylaluminum methoxide; chloromethylaluminum ethoxide; chloroethylaluminum ethoxide and the like. Exemplary of compounds where n=2 are methylaluminum dichloride; ethylaluminum dichloride; n-propylaluminum dichloride; n-butylaluminum dichloride; n-pentylaluminum dichloride; isoprenylaluminum dichloride; n-hexylaluminum dichloride; n-heptylaluminum dichloride; n-octylaluminum dichloride; isopropylaluminum dichloride; isobutylaluminum dichloride; (cylcohexylmethyl)aluminum dichloride and the like. Also exemplary are alkylaluminum sesquialkoxides such as methylaluminum sesquimethoxide; ethylaluminum sesquiethoxide; n-butylaluminum sesqui-n-butoxide and the like. Also exemplary are alkylaluminum sesquihalides such as methylaluminum sesquichloride; ethylaluminum sesquichloride; isobutylaluminum sesquichloride; ethylaluminum sesquifluoride; ethylaluminum sesquibromide; ethylaluminum sesquiiodide and the like.

Preferred for use herein as co-catalysts are trialkylaluminums such as trimethylaluminum, triethylaluminum, tri-n-propylaluminum, tri-n-butylaluminum, triisobutylaluminum, tri-n-hexylaluminum, triisohexylaluminum, tri-2-methylpentylaluminum, tri-n-octylaluminum, tri-n-decylaluminum; and dialkylaluminum halides such as dimethylaluminum chloride, diethylaluminum chloride, dibutylaluminum chloride, diisobutylaluminum chloride, diethylaluminum bromide and diethylaluminum iodide; and alkylaluminum sesquihalides such as methylaluminum sesquichloride, ethylaluminum sesquichloride, n-butylaluminum sesquichloride, isobutylaluminum sesquichloride, ethylaluminum sesquifluoride, ethylaluminum sesquibromide and ethylaluminum sesquiiodide.

Most preferred for use herein as co-catalysts are trialkylaluminums such as trimethylaluminum, triethylaluminum, tri-n-propylaluminum, tri-n-butylaluminum, triisobutylaluminum, tri-n-hexylaluminum, triisohexylaluminum, tri-2-methylpentylaluminum, tri-n-octylaluminum and dialkylaluminum halides such as dimethylaluminum chloride, diethylaluminum chloride, dibutylaluminum chloride, diisobutylaluminum chloride and alkylaluminum sesquihalides such as methylaluminum sesquichloride, ethylaluminum sesquichloride, n-butylaluminum sesquichloride and isobutylaluminum sesquichloride.

Mixtures of compounds of the above formula $X_nER_{3-n}$ also can be utilized herein as the co-catalyst.

Any halogenated hydrocarbon may be used in the process of the present invention. If desired more than one halogenated hydrocarbon can be used. Typical of such halogenated hydrocarbons are monohalogen and polyhalogen substituted saturated or unsaturated aliphatic, alicyclic, or aromatic hydrocarbons having 1 to 12 carbon-atoms.

Preferred for use in the process of the present invention are dichloromethane; dibromomethane; chloroform; carbon tetrachloride; bromochloromethane; chlorofluoromethane; bromodichloromethane; chlorodifluromethane; fluorodichloromethane; chlorotrifluoromethane; fluorotrichloromethane; 1,2-dichloroethane; 1,2-dibromoethane; 1-chloro-1-fluoroethane; 1-chloro-1,1-difluoroethane; 1-chloro-1,2-difluoroethane; 2-chloro-1,1-difluoroethane; 1,1,1,2-tetrafluoroethane; 1,1,1,2-tetrachloroethane; 2-chloro-1,1,1-trifluoroethane; 1,1-dichloro-2,2-difluoroethane; 1,2-dichloro-1,2-difluoroethane; hexafluoroethane; hexachloroethane; chloropentafluoroethane; 1,2-dibromotetrachloroethane; 1,1,2,2-tetrachloroethylene; 1-chloro-1,2,2-trifluorothylene; 1-fluoro-1,2,2-trichloroethylene; hexafluoropropene; hexachlorocyclopentadiene and hexachloropropene.

Most preferred for use in the process of the present invention are dichloromethane; chloroform; carbon tetrachloride; chlorofluoromethane; chlorodifluromethane; dichlorodifluoromethane, fluorodichloromethane; chlorotrifluoromethane; fluorotrichloromethane; 1,2-dichloroethane; 1,2-dibromoethane; 1,1,1,2-tetrachloroethane; 2-chloro-1,1,1-trifluoroethane; 1,1-dichloro-2,2-difluoroethane; 1,2-dichloro-1,2-difluoroethane; hexafluoroethane; hexachloroethane; hexafluoropropene; hexachlorocyclopentadiene and hexachloropropene.

The halogenated hydrocarbons may be used individually or as mixtures thereof.

The polymerization process of the present invention may be carried out using any suitable process, for example, solution, slurry and gas phase. A particularly desirable method for producing polyolefin polymers according to the present invention is a gas phase polymerization process preferably utilizing a fluidized bed reactor. This type reactor and means for operating the reactor are well known and completely described in U.S. Pat. Nos. 3,709,853; 4,003,712; 4,011,382; 4,012,573; 4,302,566; 4,543,399; 4,882,400; 5,352,749; 5,541,270; Canadian Patent No. 991,798 and Belgian Patent No. 839,380. These patents disclose gas phase polymerization processes wherein the polymerization medium is either mechanically agitated or fluidized by the continuous flow of the gaseous monomer and diluent. The entire contents of these patents are incorporated herein by reference.

In general, the polymerization process of the present invention may be effected as a continuous gas phase process such as a fluid bed process. A fluid bed reactor for use in the process of the present invention typically comprises a reaction zone and a so-called velocity reduction zone. The reaction zone comprises a bed of growing polymer particles, formed polymer particles and a minor amount of catalyst particles fluidized by the continuous flow of the gaseous monomer and diluent to remove heat of polymerization through the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

In more detail, the reactor temperature of the fluid bed process herein ranges from about 30° C. to about 120° C. In general, the reactor temperature is operated at the highest temperature that is feasible taking into account the sintering temperature of the polymer product within the reactor.

The process of the present invention is suitable for the production of interpolymers of ethylene, including copolymers, terpolymers, and the like, of ethylene and at least one or more other olefins wherein the ethylene content is at least about 50% by weight of the total monomers involved. Preferably the olefins are alpha-olefins. The olefins, for example, may contain from 3 to 16 carbon atoms. Exemplary olefins that may be utilized herein are propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene, 5-vinyl-2-norbornene, and olefins formed in situ in the polymerization medium. When olefins are formed in situ in the polymerization medium, the formation of ethylene/olefin interpolymers containing long chain branching may occur.

The polymerization reaction of the present invention is carried out in the presence of a Ziegler-Natta catalyst comprising at least one transition metal compound and at least one organometallic co-catalyst compound. In the process of the invention, the catalyst components can be introduced in any manner known in the art. For example, the catalyst components can be introduced directly into the polymerization medium in the form of a solution, a slurry or a dry free flowing powder. The catalyst components can be premixed to form an activated catalyst prior to addition to the polymerization medium; the components can be added separately to the polymerization medium; or the components can be premixed and then contacted with one or more olefins to form a prepolymer and then added to the polymerization medium in prepolymer form. When the catalyst components are premixed prior to introduction into the reactor, any electron donor compound may be added to the catalyst to control the level of activity of the catalyst. Furthermore during the polymerization reaction being carried out in the presence of the Ziegler-Natta catalyst, as above described, there may be added additional organometallic co-catalyst compound(s). The additional organometallic co-catalyst compound may be the same or different from that used to form the Ziegler-Natta catalyst.

In carrying out the polymerization process of the present invention, the co-catalyst(s) is added to the polymerization medium in any amount sufficient to effect production of the desired ethylene/olefin interpolymer. It is preferred to utilize the co-catalyst(s) in a molar ratio of co-catalyst(s) to metal component(s) of the olefin polymerization catalyst ranging from about 0.5:1 to about 1000:1. In a more preferred embodiment, the molar ratio of co-catalyst(s) to metal component(s) ranges from about 0.5:1 to about 100:1.

In carrying out the polymerization process of the present invention the modifier used to reduce the melting peak temperature of the ethylene/olefin interpolymer is added in any manner. For example, the modifier may be added to the preformed catalyst, to the prepolymer during the prepolymerization step, to the preformed prepolymer and/or to the polymerization medium. The modifier may optionally be premixed with the co-catalyst. The modifier is added in any amount sufficient to reduce the melting peak temperature of the ethylene/olefin interpolymer to a level lower than would result in the same polymerization process in the absence of the modifier. In a preferred embodiment the melting peak temperature is reduced by at least 0.5° C. More preferably the melting peak temperature is reduced by at least 1.0° C. Most preferred the melting peak temperature is reduced by at least 2.0° C.

When the modifier is a liquid or solid at 1 atmosphere of pressure and at 20° C., it is preferred to incorporate the modifier in a molar ratio of modifier to metal component of the olefin polymerization catalyst ranging from about 0.001:1 to about 100:1. In a more preferred embodiment, where the modifier is a liquid or solid, the molar ratio of the modifier to metal component ranges from about 0.01:1 to about 50:1. When the modifier is a gas at 1 atmosphere of pressure and at 20° C., it is preferred to incorporate the gaseous modifier at a concentration in the polymerization medium ranging from about 1 ppm by volume to about 10,000 ppm by volume. In a more preferred embodiment, the concentration of the gaseous modifier in the polymerization medium ranges from about 1 ppm by volume to about 1000 ppm by volume.

In carrying out the polymerization process of the present invention, the halogenated hydrocarbon may be added to the polymerization medium in any amount sufficient to effect production of the desired polyolefin. It is preferred to incorporate the halogenated hydrocarbon in a molar ratio of halogenated hydrocarbon to metal component of the olefin polymerization catalyst ranging from about 0.001:1 to about 100:1. In a more preferred embodiment, the molar ratio of halogenated hydrocarbon to metal component ranges from about 0.001:1 to about 10:1.

Any conventional additive may be added to the ethylene/olefin interpolymers obtained by the invention. Examples of the additives include nucleating agents, heat stabilizers, antioxidants of phenol type, sulfur type and phosphorus type, lubricants, antistatic agents, dispersants, copper harm inhibitors, neutralizing agents, foaming agents, plasticizers, anti-foaming agents, flame retardants, crosslinking agents, flowability improvers such as peroxides, ultraviolet light absorbers, light stabilizers, weathering stabilizers, weld strength improvers, slip agents, anti-blocking agents, anti-fogging agents, dyes, pigments, natural oils, synthetic oils, waxes, fillers and rubber ingredients.

The ethylene/olefin interpolymers of the present invention may be fabricated into films by any technique known in the art. For example, films may be produced by the well known cast film, blown film and extrusion coating techniques.

Further ethylene/olefin interpolymers may be fabricated into other articles of manufacture, such as molded articles, by any of the well known techniques.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way. All patents referred to herein are incorporated by reference in their entirety.

EXAMPLES

In the following examples the test procedures listed below were used in evaluating the analytical properties of the ethylene/olefin interpolymers herein.

a) Density is determined according to ASTM D-4883 from a plaque made according to ASTM D1928;

b) Melt Index (MI), $I_2$, is determined in accord with ASTM D-1238, condition E, measured at 190° C., and reported as decigrams per minute;

c) High Load Melt Index (HLMI), $I_{21}$, is measured in accord with ASTM D-1238, Condition F, measured at 10.0 times the weight used in the melt index test above;

d) Melt Flow Ratio (MFR)=$I_{21}/I_2$ or High Load Melt Index/Melt Index;

e) Residual Titanium Content in the Product. The residual titanium content in the product is measured by X-Ray Fluorescence Spectroscopy (XRF) using a Philips Sequential X-Ray Spectrometer Model PW 1480. The samples of the polymer to be evaluated were compression molded into a circular shaped plaque approximately 43 mm in diameter so as to fit the sample holder on the spectrometer and 3 to 5 mm in thickness and having a smooth flat surface. The molded test specimens were then placed in the XRF unit and the x-ray fluorescence arising from the titanium in the test specimen was measured. The residual titanium content was then determined based on a calibration curve obtained by measurements from polyethylene calibration specimens containing a known amount of titanium. The residual titanium content is reported as parts per million (ppm) relative to the polymer matrix;

f) Dart Impact is determined according to ASTM D-1709, Method A; with a 38.1 mm dart having a smooth phenolic head, and a drop height of 0.66 meter. The film thickness is about 1 mil;

g) n-Hexane Extractable—is determined in accordance with 21 CFR 177.1520 (Option 2). More particularly, an approximately 1 square inch film test specimen having a thickness ≦4 mils weighing 2.5±05 grams is placed into a tared sample basket and accurately weighed to the nearest 0.1 milligram. The sample basket containing the test specimen is then placed in a 2-liter extraction vessel containing approximately 1 liter of n-hexane. The basket is placed such that it is totally below the level of n-hexane solvent. The sample resin film is extracted for 2 hours at 49.5±0.5° C. and then the basket is raised above the solvent level to drain momentarily. The basket is removed and the contents are rinsed by immersing several times in fresh n-hexane. The basket is allowed to dry between rinsing. The excess solvent is removed by briefly blowing the basket with a stream of nitrogen or dry air. The basket is placed in the vacuum oven for 2 hours at 80±5° C. After 2 hours, it is removed and placed in a desiccator to cool to room temperature (about 1 hour). After cooling, the basket is reweighed to the nearest 0.1 milligram. The percent n-hexane extractables content is then calculated from the weight loss of the original sample; and h) Melting Peak Temperature ($T_m$) was determined in accordance with ASTM D 3418-97 using a Differential Scanning Calorimeter (DSC). The $T_m$ values listed in the tables are not true equilibrium melting points but are DSC peak temperatures of the melt transition recorded on the second heat cycle. In each case, approximately 10 mg of polymer sample was placed in an aluminum sample pan and the sample lid was crimped in place. The sample was then heated to 160° C. at a rate of 50° C./minute and held at 160° C. for 10 minutes. The sample was then cooled to −30° C. at a rate of 10° C./minute while recording the freezing or crystallization curve. After holding for 2 minutes at −30° C., the second heat cycle was initiated and the sample was heated at a rate of 10° C./minute to a final temperature of 160° C. while recording the heating curve. The melting peak temperature, $T_m$, was obtained from the melt transition on the heating curve of the second heat cycle.

Olefin Polymerization Catalysts Utilized in the Examples

The Ziegler-Natta catalyst used in Examples 1 through 6 was prepared in accordance with Example 1-a of European Patent Application EP 0 703 246 A1. The catalyst was used in prepolymer form and was prepared in accordance with Example 1-b of European Patent Application EP 0 703 246 A1. A prepolymer containing about 34 grams of polyethylene per millimole of titanium was thus obtained. This catalyst is herein referred to as Catalyst I.

The Ziegler-Natta catalyst used in Examples 7 and 8 was obtained from Toho Titanium Company, Limited under the product name THC-C. The catalyst contained 2.5 weight percent titanium and was supported on magnesium chloride. This catalyst is herein referred to as Catalyst II.

The Ziegler-Natta catalyst used in Examples 9–13 was obtained from Grace Davison, Baltimore, Md. under the product name XPO-5021. The catalyst contained 0.44 weight percent titanium and was supported on silica. This catalyst is herein referred to as Catalyst III.

Polymerization Process

The polymerization process utilized in Examples 1–13 herein was carried out in a fluidized-bed reactor for gas-phase polymerization, consisting of a vertical cylinder of diameter 0.74 meters and height 7 meters and surmounted by a velocity reduction chamber. The reactor is provided in its lower part with a fluidization grid and with an external line for recycling gas, which connects the top of the velocity reduction chamber to the lower part of the reactor, at a point below the fluidization grid. The recycling line is equipped with a compressor for circulating gas and a heat transfer means such as a heat exchanger. In particular the lines for supplying ethylene, an olefin such as 1-butene, 1-pentene and 1-hexene, hydrogen and nitrogen, which represent the main constituents of the gaseous reaction mixture passing through the fluidized bed, feed into the recycling line. Above the fluidization grid, the reactor contains a fluidized bed consisting of a polyethylene powder made up of particles with a weight-average diameter of about 0.5 mm to about 1.4 mm. The gaseous reaction mixture, which contains ethylene, olefin comonomer, hydrogen, nitrogen and minor amounts of other components, passes through the fluidized bed under a pressure ranging from about 280 psig to about 300 psig with an ascending fluidization speed, referred to herein as fluidization velocity, ranging from about 1.6 feet per second to about 2.0 feet per second.

In Examples 1–6 the Ziegler-Natta catalyst, Catalyst I, as described above in prepolymer form, was introduced intermittently into the reactor. The said catalyst contained magnesium, chlorine and titanium. The prepolymer form contained about 34 grams of polyethylene per millimole of titanium and an amount of tri-n-octylaluminum (TnOA) such that the molar ratio, TnOA/Ti, ranged from 0.9:1 to about 1.0:1. In Examples 7 and 8 the Ziegler-Natta catalyst, Catalyst II, supplied by Toho Titanium Company, Limited was introduced directly into the reactor without having been formed into a prepolymer. In Examples 9–13 the Ziegler-Natta catalyst, Catalyst III, supplied by Grace Davison was introduced directly into the reactor without having been formed into a prepolymer. The rate of introduction of the prepolymer or catalyst into the reactor was adjusted for each given set of conditions in achieving the desired production rate. During the polymerization the co-catalyst was introduced continuously into the line for recycling the gaseous reaction mixture, at a point situated downstream of the heat transfer means. The feed rate of co-catalyst is expressed as a molar ratio of trialkylaluminum to titanium (Al/Ti), and is defined as the ratio of the co-catalyst feed rate (in moles of trialkylaluminum per hour) to the catalyst or prepolymer feed rate (in moles of titanium per hour). Optionally, a solution of chloroform ($CHCl_3$) in n-hexane, at a concentration of about 0.5 weight percent, was introduced continuously into the line for recycling the gaseous reaction mixture. The feed rate of the halogenated hydrocarbon is expressed as a molar ratio of $CHCl_3$ to titanium ($CHCl_3$/Ti), and is defined as the ratio of the $CHCl_3$ feed rate (in moles of $CHCl_3$ per hour) to the catalyst or prepolymer feed rate (in moles of titanium per hour).

The modifier was tetrahydrofuran (THF) in Example 2, 8 and 10. The modifier was $N_2O$ in Examples 4 and 5. A combination of THF and $N_2O$ as the modifier was utilized in Examples 3 and 6. The modifier was acetonitrile (MeCN) in Example 11. The modifier was pyridine (Py) in Example 12. A combination of acetonitrile and pyridine was used in Example 13.

When a liquid modifier was utilized (for example THF, MeCN and Py), the liquid modifier was introduced continuously into the line for recycling the gaseous reaction mixture as a solution in either n-hexane or 1-hexene at a concentration of about I weight percent. The feed rate of modifier (Mod) is expressed as a molar ratio of modifier to titanium (Mod/Ti), and is defined as the ratio of the modifier feed rate (in moles of Modifier per hour) to the catalyst or prepolymer feed rate (in moles of titanium per hour).

When gaseous modifier was utilized (for example, $O_2$, $N_2O$, CO or $CO_2$), the gaseous modifier was introduced continuously into the line for recycling the gaseous reaction mixture. The concentration of gaseous modifier (for example, $N_2O$) in the gas phase polymerization medium is expressed in units of parts per million (ppm) by volume.

Example 1 (Comparative)

The gas phase process conditions are given in Table 1, and the resin properties are given in Table 2. The molar ratio of trimethylaluminum (TMA) to titanium (Al/Ti) was 3:1. The molar ratio of chloroform ($CHCl_3$) to titanium ($CHCl_3$/Ti) was 0.03:1. The operation was conducted without the addition of a modifier. 1-Hexene was used as comonomer. Under these conditions an ethylene interpolymer free from agglomerate was withdrawn from the reactor at a rate of 150 lb/h (pounds per hour). The productivity of the prepolymer was 375 pounds of polyethylene per pound of prepolymer.

The ethylene interpolymer had a density of 0.917 g/cc and a melt index MI ($I_2$) of 0.9 dg/min. The Melt Flow Ratio, $I_{21}/I_2$, was 33 and the n-hexane extractables were 2.9% by weight. The DSC melting peak temperature ($T_m$) was 124.5° C.

Example 2

The gas phase process conditions are given in Table 1, and the resin properties are given in Table 2. The molar ratio TMA to titanium (Al/Ti) was 7:1. The molar ratio $CHCl_3$/Ti was 0.06:1. The molar ratio of tetrahydrofuran (THF) to titanium (Mod/Ti) was 1:1. 1-Hexene was used as comonomer. Under these conditions an ethylene interpolymer free from agglomerate was withdrawn from the reactor at a rate of 192 lb/h. The productivity of the prepolymer was 231 pounds of polyethylene per pound of prepolymer.

The ethylene interpolymer had a density of 0.917 g/cc and a melt index MI ($I_2$) of 0.9 dg/min. The Melt Flow Ratio, $I_{21}/I_2$, was 31 and the n-hexane extractables were 2.0% by weight. The DSC melting peak temperature ($T_m$) was 123.9° C.

Example 3

The gas phase process conditions are given in Table 1, and the resin properties are given in Table 2. The molar ratio TMA to titanium (Al/Ti) was 7:1. The molar ratio $CHCl_3$/Ti was 0.06:1. The molar ratio THF to titanium (Mod/Ti) was 1:1. The concentration of dinitrogen monoxide ($N_2O$) in the polymerization medium was 70 ppm by volume. 1-Hexene was used as comonomer. Under these conditions an ethylene interpolymer free from agglomerate was withdrawn from the reactor at a rate of 180 lb/h. The productivity of the prepolymer was 79 pounds of polyethylene per pound of prepolymer.

The ethylene interpolymer had a density of 0.917 g/cc and a melt index MI ($I_2$) of 0.9 dg/min. The Melt Flow Ratio, $I_{21}/I_2$, was 28 and the n-hexane extractables were 1.1% by weight. The DSC melting peak temperature ($T_m$) was 122.3° C.

Example 4

The gas phase process conditions are given in Table 1, and the resin properties are given in Table 2. The molar ratio TMA to titanium (Al/Ti) was 7:1. The molar ratio $CHCl_3$/Ti was 0.06:1. The concentration of $N_2O$ in the polymerization medium was 130 ppm by volume. 1-Hexene was used as comonomer. Under these conditions an ethylene interpolymer free from agglomerate was withdrawn from the reactor at a rate of 211 lb/h. The productivity of the prepolymer was 121 pounds of polyethylene per pound of prepolymer.

The ethylene interpolymer had a density of 0.917 g/cc and a melt index MI ($I_2$) of 0.9 dg/min. The Melt Flow Ratio, $I_{21}/I_2$, was 28 and the n-hexane extractables were 1.6% by weight. The DSC melting peak temperature ($T_m$) was 122.7° C.

Example 5

The gas phase process conditions are given in Table 1, and the resin properties are given in Table 2. The molar ratio TMA to titanium (Al/Ti) was 7:1. The molar ratio $CHCl_3$/Ti was 0.06:1. The concentration of $N_2O$ in the polymerization medium was 210 ppm by volume. 1-Hexene was used as comonomer. Under these conditions an ethylene interpolymer free from agglomerate was withdrawn from the reactor at a rate of 194 lb/h. The productivity of the prepolymer was 124 pounds of polyethylene per pound of prepolymer.

The ethylene interpolymer had a density of 0.917 g/cc and a melt index MI ($I_2$) of 0.9 dg/min. The Melt Flow Ratio, $I_{21}/I_2$, was 28 and the n-hexane extractables were 1.1% by weight. The DSC melting peak temperature ($T_m$) was 122.2° C.

Example 6

The gas phase process conditions are given in Table 1, and the resin properties are given in Table 2. The molar ratio TMA to titanium (Al/Ti) was 7:1. The molar ratio $CHCl_3$/Ti was 0.06:1. The molar ratio THF to titanium (Mod/Ti) was 0.3:1. The concentration of $N_2O$ in the polymerization medium was 300 ppm by volume. 1-Hexene was used as comonomer. Under these conditions an ethylene interpolymer free from agglomerate was withdrawn from the reactor at a rate of 192 lb/h. The productivity of the prepolymer was 83 pounds of polyethylene per pound of prepolymer.

The ethylene interpolymer had a density of 0.917 g/cc and a melt index MI ($I_2$) of 0.9 dg/min. The Melt Flow Ratio, $I_{21}/I_2$, was 27 and the n-hexane extractables were 0.8% by weight. The DSC melting peak temperature ($T_m$) was 120.0° C.

From the above data in Examples 1–6 and Tables 1 and 2 the following observations may be made. The addition of a modifier to the polymerization medium resulted in the preparation of an ethylene/1-hexene interpolymer, of a given melt index and density, having a reduced melting peak temperature ($T_m$) as measured by DSC. From the Examples 1–6 and Tables 1 and 2 it is further observed that the extent of the decrease in the DSC melting peak temperature is dependent upon the modifier utilized and/or the amount of modifier utilized.

Example 7 (Comparative)

The gas phase process conditions are given in Table 3, and the resin properties are given in Table 4. The molar ratio of trimethylaluminum (TMA) to titanium was 30:1. 1-Hexene was used as comonomer. Under these conditions an ethylene interpolymer free from agglomerate was withdrawn from the reactor at a rate of 229 lb/h.

The ethylene interpolymer had a density of 0.918 g/cc and a melt index MI ($I_2$) of 0.9 dg/min. The Melt Flow Ratio, $I_{21}/I_2$, was 30. The DSC melting peak temperature ($T_m$) was 124.8° C.

TABLE 1

Reactor Conditions for Examples 1 through 6

| | Example | | | | | |
|---|---|---|---|---|---|---|
| | 1 | 2 | 3 | 4 | 5 | 6 |
| Reactor Pressure (psig) | 290 | 296 | 295 | 294 | 295 | 297 |
| Reactor Temperature (° C.) | 84 | 84 | 84 | 84 | 84 | 86 |
| Fluidization Velocity (ft/sec) | 1.8 | 1.9 | 1.9 | 1.9 | 1.9 | 1.8 |
| Fluidized Bulk Density (lb/ft$^3$) | 17.0 | 17.8 | 17.1 | 17.5 | 16.7 | 15.2 |
| Reactor Bed Height (ft) | 9.4 | 10.2 | 10.2 | 10.0 | 10.4 | 12.8 |
| Ethylene (mole %) | 38 | 32 | 32 | 32 | 32 | 41 |
| H2/C2 (molar ratio) | 0.178 | 0.157 | 0.140 | 0.113 | 0.110 | 0.080 |
| 1-Hexene/C2 (molar ratio) | 0.191 | 0.153 | 0.138 | 0.128 | 0.124 | 0.115 |
| Co-catalyst | TMA | TMA | TMA | TMA | TMA | TMA |
| Al/Ti (molar ratio) | 3 | 7 | 7 | 7 | 7 | 7 |
| $CHCl_3$/Ti | 0.03 | 0.06 | 0.06 | 0.06 | 0.06 | 0.06 |
| Modifier 1 | none | THF | THF | none | none | THF |
| $Mod_1$/Ti (molar ratio)[1] | — | 1 | 1 | — | — | 0.3 |
| Modifier 2 | none | none | $N_2O$ | $N_2O$ | $N_2O$ | $N_2O$ |
| $N_2O$ (ppm by volume) | — | — | 70 | 130 | 210 | 300 |
| Catalyst Type | I | I | I | I | I | I |
| Prepolymer Rate (lb/h) | 0.4 | 0.83 | 2.29 | 1.74 | 1.56 | 2.30 |
| Prnduction Rate (lb/h) | 150 | 192 | 180 | 211 | 194 | 192 |
| Productivity (mass ratio) | 375 | 231 | 79 | 121 | 124 | 83 |
| Space Time Yield (lb/h – ft$^3$) | 3.6 | 4.0 | 3.8 | 4.6 | 4.0 | 3.2 |
| Residual Titanium (ppm) | 3.8 | 5.9 | 17.5 | 11.3 | 11.0 | 16.9 |

[1]modifier 1 denoted as $Mod_1$.

TABLE 2

Resin Properties for Ethylene/Olefin Interpolymers Prepared in Examples 1–6

| | Example | | | | | |
|---|---|---|---|---|---|---|
| | 1 | 2 | 3 | 4 | 5 | 6 |
| Density (g/cc) | 0.917 | 0.917 | 0.917 | 0.917 | 0.917 | 0.917 |
| Melt Index, $I_2$ (dg/min) | 0.9 | 0.9 | 0.9 | 0.9 | 0.9 | 0.9 |
| Melt Flow Ratio ($I_{21}/I_2$) | 33 | 31 | 28 | 28 | 28 | 27 |
| n-Hexane Extractable (wt %) | 2.9 | 2.0 | 1.1 | 1.6 | 1.1 | 0.8 |
| DSC, $T_m$ (° C.)[1] | 124.5 | 123.9 | 122.3 | 122.7 | 122.2 | 120.0 |
| Dart Impact (g/mil) | 200 | 330 | 380 | 400 | 580 | 1750 |

[1]DSC melting peak temperature, $T_m$.

Example 8

The gas phase process conditions are given in Table 3, and the resin properties are given in Table 4. The molar ratio of trimethylaluminum (TMA) to titanium was 19:1. The molar ratio of $CHCl_3$ to titanium was 0.06:1. The molar ratio of THF to titanium was 2.5:1. 1-Hexene was used as comonomer. Under these conditions an ethylene interpolymer free from agglomerate was withdrawn from the reactor at a rate of 201 lb/h.

The ethylene interpolymer had a density of 0.918 g/cc and a melt index MI ($I_2$) of 0.8 dg/min. The Melt Flow Ratio, $I_{21}/I_2$, was 27. The DSC melting peak temperature ($T_m$) was 124.4° C.

Example 9 (Comparative)

The gas phase process conditions are given in Table 3, and the resin properties are given in Table 4. The molar ratio of triethylaluminum (TEAL) to titanium was 20:1. 1-Hexene was used as comonomer. Under these conditions an ethylene interpolymer free from agglomerate was withdrawn from the reactor at a rate of 212 lb/h.

The ethylene interpolymer had a density of 0.917 g/cc and a melt index MI ($I_2$) of 0.9 dg/min. The Melt Flow Ratio, $I_{21}/I_2$, was 27. The DSC melting peak temperature ($T_m$) was 124.4° C.

Example 10

The gas phase process conditions are given in Table 3, and the resin properties are given in Table 4. The molar ratio of triethylaluminum (TEAL) to titanium was 20:1. The molar ratio of $CHCl_3$ to titanium was 0.06:1. The molar ratio of THF to titanium was 4:1. 1-Hexene was used as comonomer. Under these conditions an ethylene interpolymer free from agglomerate was withdrawn from the reactor at a rate of 208 lb/h.

The ethylene interpolymer had a density of 0.917 g/cc and a melt index MI ($I_2$) of 0.9 dg/min. The Melt Flow Ratio, $I_{21}/I_2$, was 27. The DSC melting peak temperature ($T_m$) was 122.9° C.

TABLE 3

Reactor Conditions for Examples 7 through 10

| | Example | | | |
|---|---|---|---|---|
| | 7 | 8 | 9 | 10 |
| Reactor Pressure (psig) | 295 | 294 | 294 | 294 |
| Reactor Temperature (° C.) | 85 | 85 | 86 | 86 |
| Fluidization Velocity (ft/sec) | 1.8 | 1.9 | 1.8 | 1.8 |
| Fluidized Bulk Density (lb/ft³) | 17.1 | 18.1 | 13.9 | 14.3 |
| Reactor Bed Height (ft) | 10 | 10 | 12 | 12 |
| Ethylene (mole %) | 27.7 | 25.2 | 40.3 | 32.3 |
| H2/C2 (molar ratio) | 0.210 | 0.283 | 0.276 | 0.287 |
| 1-Hexene/C2 (molar ratio) | 0.175 | 0.193 | 0.112 | 0.110 |
| Co-catalyst | TMA | TMA | TEAL | TEAL |
| Al/Ti (molar ratio) | 30 | 19 | 20 | 20 |
| $CHCl_3$/Ti | 0 | 0.06 | 0 | 0.06 |
| Modifier 1 | none | THF | none | THF |
| $Mod_1$/Ti (molar ratio)[1] | — | 2.5 | — | 4 |
| Catalyst Type | II | II | III | III |
| Production Rate (lb/h) | 229 | 201 | 212 | 208 |
| Space Time Yield (lb/h-ft³) | 78.3 | 72.8 | 60.8 | 59.9 |
| Residual Titanium (ppm) | 0.8 | 1.1 | 0.6 | 0.4 |

[1]modifier 1 denoted as $Mod_1$.

TABLE 4

Resin Properties for Ethylene/Olefin Interpolymers prepared in Examples 7-10

| | Example | | | |
|---|---|---|---|---|
| | 7 | 8 | 9 | 10 |
| Density (g/cc) | 0.918 | 0.918 | 0.917 | 0.917 |
| Melt Index, $I_2$ (dg/min) | 0.9 | 0.8 | 0.9 | 0.9 |
| Melt Flow Ratio ($I_{21}/I_2$) | 30 | 27 | 27 | 27 |
| DSC, $T_m$ (° C.)[1] | 124.8 | 124.4 | 124.4 | 122.9 |
| Dart Impact (g/mil) | 249 | 454 | 1570 | 1075 |

[1]DSC melting peak temperature, $T_m$.

From the above data in Examples 7 and 8 and Tables 3 and 4 the following observations may be made. The addition of a modifier to the polymerization medium resulted in the production of an ethylene/1-hexene interpolymer, of a given melt index and density, having a reduced melting peak temperature ($T_m$) as measured by DSC.

From the above data in Examples 9–10 and Tables 3 and 4 the following observations may be made. The addition of a modifier to the polymerization medium resulted in the production of an ethylene/1-hexene interpolymer, of a given melt index and density, having a reduced melting peak temperature ($T_m$) as measured by DSC.

Example 11–13

The process of Example 10 was followed with the exception that in place of THF, the modifier(s) utilized was as follows.

Example 11 acetonitrile at a molar ratio to titanium of 1:1,

Example 12 pyridine at a molar ratio to titanium of 1:1,

Example 13 acetonitrile at a molar ratio to titanium of 1:1 and pyridine at a molar ratio to titanium of 1:1.

In each of the above Examples 11–13 a satisfactory ethylene interpolymer was produced.

Examples 14–38

The process of Example 2 is followed with the exception that in place of THF, the modifier utilized to reduce the DSC melting peak temperature of the ethylene/1-hexene interpolymer is as follows. The particular electron donor is utilized in an amount sufficient to reduce the melting peak temperature of the ethylene/1-hexene interpolymer.

Example 14 diethyl ether,

Example 15 dibutyl ether,

Example 16 diisopropyl ether,

Example 17 tert-butyl methyl ether,

Example 18 1,2-dimethoxyethane,

Example 19 furan,

Example 20 ethyl benzoate,

Example 21 p-ethoxy ethyl benzoate,

Example 22 2-butanone,

Example 23 2,4-dimethyl-3-pentanone,

Example 24 triisopropylamine,

Example 25 1-isobutylpiperidine,

Example 26 N,N-dimethylformamide,

Example 27 N,N-dimethylacetamide,

Example 28 benzonitrile,

Example 29 isopropionitrile,

Example 30 trifluoroacetaldehyde,

Example 31 benzaldehyde,

Example 32 tetrahydrothiophene,

Example 33 2,5-dimethyltetrahydrothiophene,

Example 34 isopropyl thiobenzoate,

Example 35 isobutyl thiolacetate,

Example 36 cyclohexylmethyldimethoxysilane,

Example 37 tetraethyl orthosilicate,

Example 38 dicyclopentyldimethoxysilane,

In each of the above Examples 14–38 the DSC melting peak temperature ($T_m$) of the ethylene/1-hexene interpolymer, having a given melt index and density, is expected to be reduced as a result of utilizing the particular modifier hereinabove in the polymerization medium in place of THF as the modifier.

Examples 39–43

The process of Example 2 is followed with the exception that in place of the 1-hexene there is utilized the following comonomers:

Example 39 propylene,

Example 40 1-butene,

Example 41 1-pentene,

Example 42 4-methylpent-1-ene,

Example 43 1-octene.

In each of the above Examples 39–43 the DSC melting peak temperature ($T_m$) of the ethylene interpolymer, having a given melt index and density, is expected to be reduced as a result of incorporating THF in the polymerization medium.

Films can be prepared from the ethylene/olefin interpolymers of the present invention.

Articles such as molded items can also be prepared from the ethylene/olefin interpolymers of the present invention.

It should be clearly understood that the forms of the invention herein described are illustrative only and are not intended to limit the scope of the invention. The present invention includes all modifications falling within the scope of the following claims.

We claim:

1. A process for reducing the melting peak temperature ($T_m$) of an ethylene/olefin interpolymer having a given density and melt index (MI), the process comprising introducing at least one modifier comprising at least one atom selected from Group 15 and Group 16 of the Periodic Table of Elements, into a polymerization process comprising ethylene and at least one or more other olefin(s) and at least one Ziegler-Natta catalyst comprised of a component comprising at least one transition metal and a co-catalyst comprising at least one organometallic compound, in an amount sufficient to reduce the melting peak temperature ($T_m$) of the ethylene/olefin interpolymer to a level lower than would result in the same polymerization process in the absence of the modifier.

2. The process according to claim 1 wherein the metal of the at least one transition metal is selected from Groups 4, 5, 6, 7, 8, 9 and 10 of the Periodic Table of the Elements.

3. The process according to claim 2 wherein the metal is selected from the group consisting of titanium, zirconium, vanadium, iron, chromium, nickel and mixtures thereof.

4. The process according to claim 3 wherein the metal is selected from the group consisting of titanium, zirconium, vanadium and mixtures thereof.

5. The process according to claim 1 wherein the at least one co-catalyst compound is an organometallic compound having the formula, $$X_nER_{3-n},$$

or mixtures thereof, wherein

X is hydrogen, halogen, or mixtures of halogens, selected from fluorine, chlorine, bromine and iodine, n ranges from 0 to 2, and E is an element from Group 13 of the Periodic Table of Elements, and R is a hydrocarbon group, containing from 1 to 100 carbon atoms and from 0 to 10 oxygen atoms, connected to the Group 13 element by a carbon or oxygen bond.

6. The process according to claim 5 wherein the organometallic co-catalyst compound is selected from the group consisting of trialkylaluminums, dialkylaluminum halides and alkylaluminum sesquihalides.

7. The process according to claim 6 wherein the trialkylaluminum is selected from the group consisting of trimethylaluminum, triethylaluminum, tri-n-propylaluminum, tri-n-butylaluminum, triisobutylaluminum, tri-n-hexylaluminum, triisohexyaluminum, tri-2-methylpentylaluminum, and tri-n-octylaluminum, the dialkylaluminum halide is selected from the group consisting of dimethylaluminum chloride, diethylaluminum chloride, dibutylaluminum chloride, and diisobutylaluminum chloride, and the alkylaluminum sesquihalide is selected from the group consisting of ethylaluminum sesquichloride, ethylaluminum sesquichloride, n-butylaluminum sesquichloride and isobutylaluminum sesquichloride.

8. The process according to claim 7 wherein the trialkylaluminum is selected from the group consisting of trimethylaluminum and triethylaluminum.

9. The process according to claim 1 wherein the Ziegler-Natta catalyst is supported on a carrier.

10. The process according to claim 9 wherein the carrier is selected from the group consisting of silica, alumina, magnesium chloride and mixtures thereof.

11. The process according to claim 1 further comprising adding a halogenated hydrocarbon to the polymerization medium.

12. The process according to claim 11 wherein the halogenated hydrocarbon is selected from the group consisting of dichloromethane, chloroform, carbon tetrachloride, chlorofluoromethane, chlorodifluromethane, dichlorodifluoromethane, fluorodichloromethane, chlorotrifluoromethane, fluorotrichloromethane and 1,2-dichloroethane.

13. The process according to claim 12 wherein the halogenated hydrocarbon is chloroform.

14. The process according to claim 1 wherein the at least one modifier is selected from the group consisting of carboxylic acid esters, anhydrides, acid halides, ethers, thioethers, aldehydes, ketones, imines, amines, amides, nitriles, isonitriles, cyanates, isocyanates, thiocyanates, isothiocyanates, thioesters, dithioesters, carbonic esters, hydrocarbyl carbamates, hydrocarbyl thiocarbamates, hydrocarbyl dithiocarbamates, urethanes, sulfoxides, sulfones, sulfonamides, organosilicon compounds containing at least one oxygen atom, compounds of nitrogen, phosphorus, arsenic or antimony connected to an organic group through a carbon or oxygen atom, $O_2$, CO, $CO_2$, COS, NO, $N_2O$ and $NO_2$.

15. The process according to claim 14 wherein the at least one modifier is selected from the group consisting of carboxylic acid esters, ethers, amines, amides, nitriles, organosilicon compounds containing at least one oxygen atom, $O_2$, CO, $CO_2$ and $N_2O$.

16. The process according to claim 15 wherein the at least one modifier is an ether selected from the group consisting of tetrahydrofuran, diethyl ether, dipropyl ether, diisopropyl ether, dibutyl ether, dioctyl ether, tert-butyl methyl ether, trimethylene oxide, 1,2-dimethoxyethane, 1,2-dimethoxypropane, 1,3-dimethoxypropane, 1,2-dimethoxybutane, 1,3-dimethoxybutane, 1,4-dimethoxybutane, and tetrahydropyran.

17. The process according to claim 15 wherein the at least one modifier is an amine selected from the group consisting of pyridine, 4-methyl pyridine, N-methylmorpholine and N-methylimidazole.

18. The process according to claim 15 wherein the at least one modifier is an organosilicon compound containing at least one oxygen atom selected from the group consisting of cyclohexylmethyldimethoxysilane, tetraethyl orthosilicate and dicyclopentyldimethoxysilane.

19. The process according to claim 15 wherein the at least one modifier is a nitrile selected from the group consisting of acetonitrile, trimethylacetonitrile, benzonitrile and isopropionitrile.

20. The process according to claim 15 wherein the at least one modifier is an amide selected from the group consisting of N,N-dimethylformamide, N,N-dimethylacetamide and N,N-diisopropylformamide.

21. The process according to claim 15 wherein the at least one modifier is selected from the group consisting of $O_2$, CO, $CO_2$ and $N_2O$.

22. The process according to claim 21 wherein the at least one modifier is $N_2O$.

23. The process according to claim 11 wherein the at least one modifier is liquid or solid and is added in a molar ratio of modifier to the transition metal component of the Ziegler-Natta catalyst ranging from about 0.01:1 to about 100:1.

24. The process according to claim 23 wherein the molar ratio of modifier to the transition metal component of the Ziegler-Natta catalyst ranges from about 0.1:1 to about 50:1.

25. The process according to claim 1, wherein the at least one modifier is gaseous and is added in an amount ranging from about 1 ppm by volume to about 10,000 ppm by volume.

26. The process according to claim 25 wherein the at least one modifier is added in an amount ranging from about 1 ppm by volume to about 1000 ppm by volume.

27. The process according to claim 1 wherein the polymerization medium is gas phase.

28. The process according to claim 1 wherein the polymerization medium is slurry phase.

29. The process according to claim 1 wherein the at least one or more other olefin(s) is selected from the group consisting of olefins having 3 to 16 carbon atoms.

30. The process according to claim 29 wherein the at least one or more other olefin(s) is selected from the group consisting of 1-octene, 1-hexene, 4-methylpent-1-ene, 1-pentene, 1-butene and propylene.

31. The process according to claim 1 wherein the ethylene/olefin interpolymer comprises ethylene in an amount of at least about 50% by weight of the interpolymer.

* * * * *